(12) United States Patent
Yasui et al.

(10) Patent No.: US 7,276,008 B2
(45) Date of Patent: Oct. 2, 2007

(54) DRIVE SYSTEM

(75) Inventors: Yuji Yasui, Wako (JP); Takashi Haga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/648,550

(22) Filed: Jan. 3, 2007

(65) Prior Publication Data

US 2007/0184928 A1    Aug. 9, 2007

Related U.S. Application Data

(63) Continuation-in-part of application No. 10/864,342, filed on Jun. 10, 2004, now abandoned.

(30) Foreign Application Priority Data

Jun. 12, 2003    (JP) ............................... 03-167641 u

(51) Int. Cl.
*F16H 3/72*    (2006.01)

(52) U.S. Cl. .................. 475/5; 477/5; 74/335; 74/661; 180/65.2; 180/65.4; 180/65.7

(58) Field of Classification Search .................... 475/5; 74/335, 661; 477/5
See application file for complete search history.

(56) References Cited

U.S. PATENT DOCUMENTS 5,285,111 A    2/1994    Sherman

| | | |
|---|---|---|
| 5,598,910 A | 2/1997 | Moroto et al. |
| 5,846,155 A | 12/1998 | Taniguchi et al. |
| 5,895,333 A | 4/1999 | Morisawa et al. |
| 6,159,127 A | 12/2000 | Loeffler et al. |
| 6,401,899 B1 | 6/2002 | Kanehisa et al. |
| 6,622,805 B2 | 9/2003 | Nakashima |
| 6,634,986 B2 | 10/2003 | Kima |
| 6,719,655 B2 | 4/2004 | Kramer |
| 6,805,648 B1 | 10/2004 | Ehrlinger |
| 6,811,508 B2 | 11/2004 | Tumback |
| 2003/0069103 A1 | 4/2003 | Ibamoto et al. |

FOREIGN PATENT DOCUMENTS

| | | |
|---|---|---|
| JP | 2000-002327 | 1/2000 |
| WO | WO 0107278 A1 | 2/2001 |
| WO | WO 183249 A2 | 11/2001 |

*Primary Examiner*—David D. Le
(74) *Attorney, Agent, or Firm*—Arent Fox LLP

(57) ABSTRACT

A drive system includes an output shaft of an engine connected to a sun gear of a planetary gear assembly. An electric motor is connected, via gears, to a carrier rotatably supporting a planetary pinion gear that rotates around the outer circumference of the sun gear while rotating on its axis in engagement with the sun gear. An input shaft of a STEPTRONIC™ transmission is connected to a ring gear that rotates in engagement with the planetary pinion gear. The drive system further includes an engine clutch directly coupling the output shaft of the engine to the ring gear, a ring gear brake that regulates the rotation of the ring gear, and a torque converter clutch and a torque converter for transmitting the driving force of the electric motor to an output shaft of the STEPTRONIC™ transmission.

10 Claims, 23 Drawing Sheets

DRIVE SYSTEM

CROSS-REFERENCE TO RELATED APPLICATION

This is a Continuation-in-Part of application Ser. No. 10/864,342 filed Jun. 10, 2004, now abandoned. The disclosure of the prior application is hereby incorporated by reference herein in its entirety.

BACKGROUND OF THE INVENTION

1. Field of the Invention

The present invention relates to a drive system that outputs a driving force by combining a motive power source and an electric drive source.

2. Description of the Related Art

Hitherto, a hybrid vehicle provided with an engine 100 for traveling drive, a motor 101 and a generator 102, as shown in FIG. 23, has been known (refer to, for example, Japanese Laid-Open Patent Publication No. 2000-2327). The hybrid vehicle is adapted to provide a driving force required for travel by combining the driving force for travel output from the engine 100 and motive power output from the motor 101 if the motive power supplied by the engine 100 is not adequate to cover the required driving force.

If the motive power output from the engine 100 is more than necessary, then the motor 101 is operated as a generator to cause regenerative electric power to be collected by a battery 103 through an inverter 105. Operating the engine 100 and the motor 101 in cooperation, as described above, makes it possible to reduce the volume of fuel consumed by the engine 100 and to efficiently use the collected regenerative electric power.

The generator 102 provided in the hybrid vehicle collects generated electric power into the battery 103 through the intermediary of the inverter 105 and also supplies the generated power to the motor 101 through the intermediary of the inverter 105 so as to actuate the motor 101. A motive power distributor 104 adjusts the ratio at which an output of the engine 100 is distributed to drive wheels 107 and the generator 102, permitting higher efficiency of the engine to be achieved with consequent improved fuel efficiency.

However, providing the generator 102 separately in addition to the motor 101 adds to the weight of the hybrid vehicle, as compared with a case where only the motor 101 is provided, so that expected improvement in fuel efficiency may not be obtained. In some cases, the increased weight of the vehicle may cause deteriorated steering stability. Providing the generator 102 and the motor 101 complicates the construction of the vehicle, resulting in deteriorated reliability of the vehicle.

SUMMARY OF THE INVENTION

The present invention has been made with a view of the background described above, and it is an object of the invention to provide a drive system with improved energy efficiency for operating a motive power source and an electric drive source in cooperation by a simple construction without using a dedicated generator.

To this end, according to the present invention, there is provided a drive system including a motive power source, an electric drive source equipped with functions of a generator and a motor, a planetary gear mechanism, and a transmission, wherein the planetary gear mechanism comprises three rotary elements, namely, a sun gear rotating about the center of a central shaft, a carrier which rotatably supports a planetary pinion gear moving about the outer periphery of the sun gear while rotating on its axis in engagement with the sun gear and which rotates about the center of the central shaft, and a ring gear rotating about the center of the central shaft on the outer side of the planetary pinion gear while being meshed with the planetary pinion gear, one of the three rotary elements of the planetary gear mechanism is connected to an output shaft of the motive power source, another one of the rotary elements is connected to an input shaft of the transmission, and the remaining one of the rotary elements is connected to an input/output shaft of the electric drive source.

With this arrangement, the motive power source and the electric drive source are both operated so as to allow a driving force exceeding a maximum driving force supplied by the motive power source to be transmitted to the input shaft of the transmission through the intermediary of the planetary gear assembly. Furthermore, only the electric drive source can be actuated, with the motive power source turned off, allowing the transmission to be operated by the electric driving source alone. Moreover, operating the electric drive source as the generator allows the transmission to reduce speed by collecting regenerative electric power. The present invention obviates the need for installing a generator in addition to the electric driving source, so that the operation described above can be accomplished by a simple construction, preventing efficiency of energy use from deteriorating by an increased weight attributable to the addition of a generator.

Preferably, the drive system includes a rotation regulating device for regulating the rotation of the rotary element connected to the input shaft of the transmission.

With this arrangement, disabling the rotation of a rotating element connected to the input shaft of the transmission by the rotation regulating device causes the motive power source and the electric drive source to be drivingly connected with each other through the intermediary of the planetary gear assembly according to a working principle of the planetary gear assembly. Hence, for example, the electric drive source can be operated as the generator by operating the motive power source in this state. If the motive power source is an internal combustion engine, the internal combustion engine can be cranked by actuating the electric drive source in this state.

Preferably, the drive system further includes a motive power connecting and disconnecting device for switching connection/disconnection between the output shaft of the motive power source and the input shaft of the transmission.

With this arrangement, when the motive power connecting/disconnecting device is set for a connecting mode, the driving force of the transmission can be transmitted from the motive force source by directly connecting the output shaft of the motive power source and the input shaft of the transmission. Thus, the loss incurred when the driving force is transmitted from the motive power source to the transmission can be restrained.

Preferably, the transmission comprises a STEP-TRONIC™ transmission having an input shaft provided with a train of input gears and an output shaft provided with a train of output gears meshing with the train of input gears, and the drive system comprises a driving force transmitting device provided between the input/output shaft of the electric drive source and the output shaft of the STEP-TRONIC™ transmission for adjusting a driving force output from the electric drive source and transmitting the adjusted driving force to the output shaft of the STEPTRONIC™ transmission.

With this arrangement, if the motive power transmitted from the input shaft to the output shaft of the STEPTRONIC™ transmission is cut off or reduced in the process of the speed change of the STEPTRONIC™ transmission, then an appropriate driving force can be transmitted from the electric driving device to the output shaft of the STEPTRONIC™ transmission through the intermediary of the driving force transmitting device. This makes it possible to prevent the occurrence of a period in which adequate motive power is not transmitted from the electric driving device to the output shaft of the STEPTRONIC™ transmission, thus restraining fluctuation in output from the output shaft of the STEPTRONIC™ transmission that may take place in the speed change process.

Preferably, the driving force transmitting device comprises a torque converter.

With this arrangement, when a driving force is transmitted from the electric drive source to the output shaft of the STEPTRONIC™ transmission, a difference in the rotational speed between the electric drive source and the output shaft can be absorbed by the torque converter. Therefore, the driving force transmitting device permits easy control for adjusting the driving force transmitted from the electric drive source to the output shaft of the STEPTRONIC™ transmission. Moreover, amplifying torque by the torque converter reduces the output required of the electric driving source, so that the electric driving source can be made smaller.

Preferably, the transmission comprises a STEPTRONIC™ transmission having an input shaft provided with a train of input gears and an output shaft provided with a train of output gears meshing with the train of input gears, and the drive system comprises a speed changing control device for controlling the rotational speed of the electric drive source such that the rotational speed of the input shaft of the STEPTRONIC™ transmission corresponds to the rotational speed obtained by multiplying the rotational speed of the output shaft of the STEPTRONIC™ transmission by a gear ratio of a new speed when a speed changing operation is performed in the STEPTRONIC™ transmission.

With this arrangement, the speed changing control device controls the rotational speed of the electric motive power source with good control responsiveness such that the rotational speed of the input shaft of the STEPTRONIC™ transmission will be the rotational speed obtained by multiplying the rotational speed of the output shaft by a gear ratio of a new speed. This makes it possible to quickly synchronize the numbers of revolutions of the input shaft and the output shaft of the STEPTRONIC™ transmission so as to reduce a shock when speed is changed.

Preferably, the drive system according to the present invention further includes a transmitted driving force control device for adjusting motive power to be transmitted to the STEPTRONIC™ transmission from a rotating element connected to the output shaft of the electric drive source by the motive power transmitting device on the basis of the rotational speed of the output shaft of the STEPTRONIC™ transmission in the process of speed change in the STEPTRONIC™ transmission.

With this arrangement, the driving force transmitted to the output shaft of the STEPTRONIC™ transmission from the input/output shaft of the electric drive source by the driving force transmitting device can be adjusted by the transmitted driving force control device according to the rotational speed of the output shaft of the STEPTRONIC™ transmission. This makes it possible to adjust an excessive or insufficient driving force transmitted to the output shaft of the STEPTRONIC™ transmission by means of the driving force from the electric drive source while changing the speed. This agreement makes it possible to restrain fluctuation in the rotational speed of the output shaft of the STEPTRONIC™ transmission during the speed change process.

Preferably, the drive system is mounted on a movable body, and includes a motive power source control device for controlling an output of the motive power source according to an instruction for a predetermined driving condition, and an electric drive source control device for controlling an output of the electric drive source so that an actual speed of the movable body follows a target speed of the movable body set according to the instruction for a driving condition.

With this arrangement, an output of the motive power source is set according to the driving condition by the motive power source control device, and an output of the electric drive source is controlled by the electric drive source control means so that the actual speed of the movable body follows the target speed. In this case, it is possible to make the actual speed of the movable body follow the target speed by setting the output of the motive power source so as to obtain high energy efficiency and then by adjusting the output of the electric drive source.

Preferably, the drive system according to the present invention further includes a driving force managing device for determining an output of the motive power source according to a charged condition of storage device connected to the electric drive source.

This arrangement makes it possible to prevent an excessive or insufficient charge amount of the storage device by determining the distribution of the output of the motive power source and the output of the electric drive source according to a charged state of the storage device.

Preferably, the electric drive source control device determines an output of the electric drive source by using response specifying control that permits variable designation of an attenuation behavior and an attenuation speed of a difference between the target speed and the actual speed of the movable body so as to make the actual speed of the movable body follow the target speed.

With this arrangement, the electric drive source control device determines the output of the electric drive source by using the response specifying control so as to restrain response delays or overshoots. This allows the actual speed of the movable body to accurately follow the target speed.

Preferably, the drive system according to the present invention further includes a braking device for braking the movable body and a braking control device for determining a braking force of the braking device by using response specifying control that permits variable designation of an attenuation behavior and an attenuation speed of a difference between the target speed and the actual speed of the movable body so as to make the actual speed of the movable body follow the target speed.

With this arrangement, if it is impossible to make the actual speed of the movable body follow the target speed even when the output of the electric drive source is controlled by the electric drive source control device to operate the electric drive source as a generator so as to produce a decelerating force, then the response specifying control is used to actuate the braking device thereby to restrain response delays or overshoots. This allows the actual speed of the movable body to follow the target speed.

An attenuation speed of the difference between the target speed and the actual speed of the movable body in the response specifying control used by the electric drive source control means is set to be higher than an attenuation speed of the difference between the target speed and the actual speed of the movable body in the response specifying control used by the braking control device.

This arrangement makes it possible to prevent braking forces applied to the movable body from becoming unstable by interference between the response specifying control used by the electric drive source control device and the response specifying control used by the braking control device. In addition, the control of the electric drive source by the electric drive source control means is carried out before the control over the braking means by the braking control device. This makes it possible to efficiently collect the decelerating energy of the movable body by the generating operation of the electric drive source and then to make the actual speed of the movable body accurately follow the target speed by the braking device.

DESCRIPTION OF THE PREFERRED EMBODIMENTS

Figure 1:
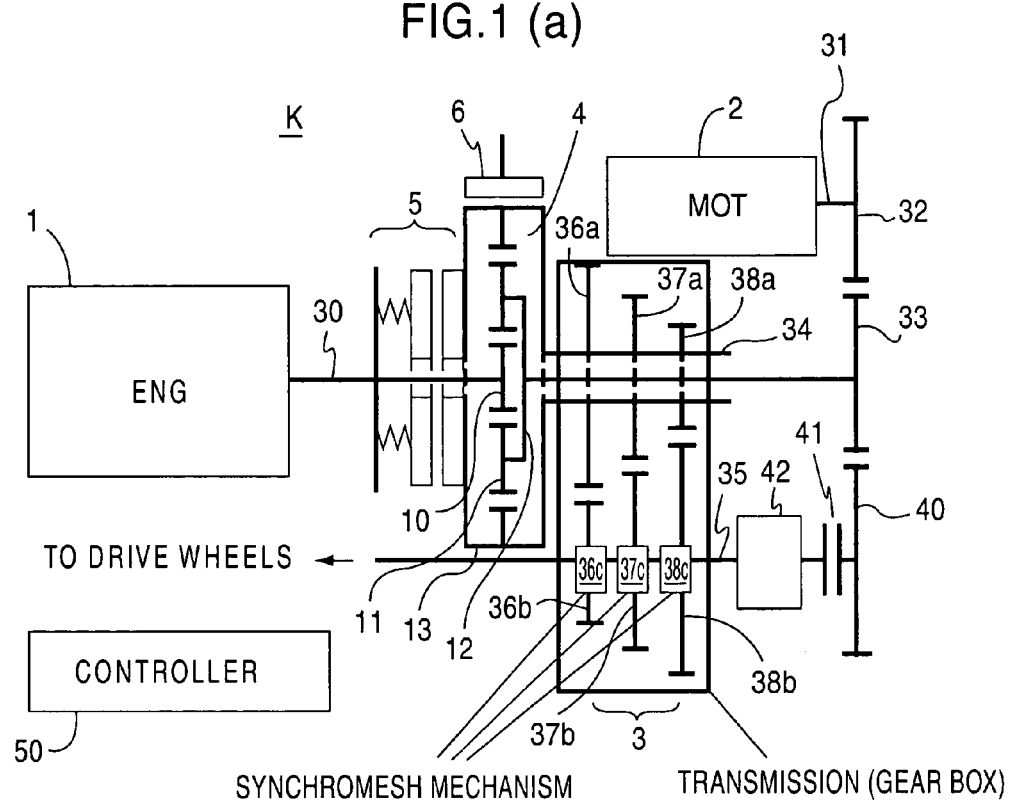
FIG. 1A is a general block diagram of a drive system in accordance with the present invention.
FIG. 1B is a cross-sectional view of a planetary gear assembly.
Figure 1:
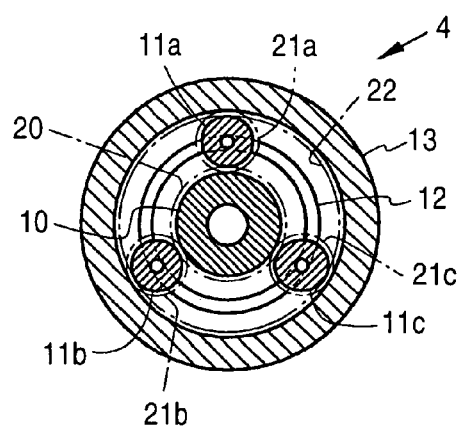
Figure 2:
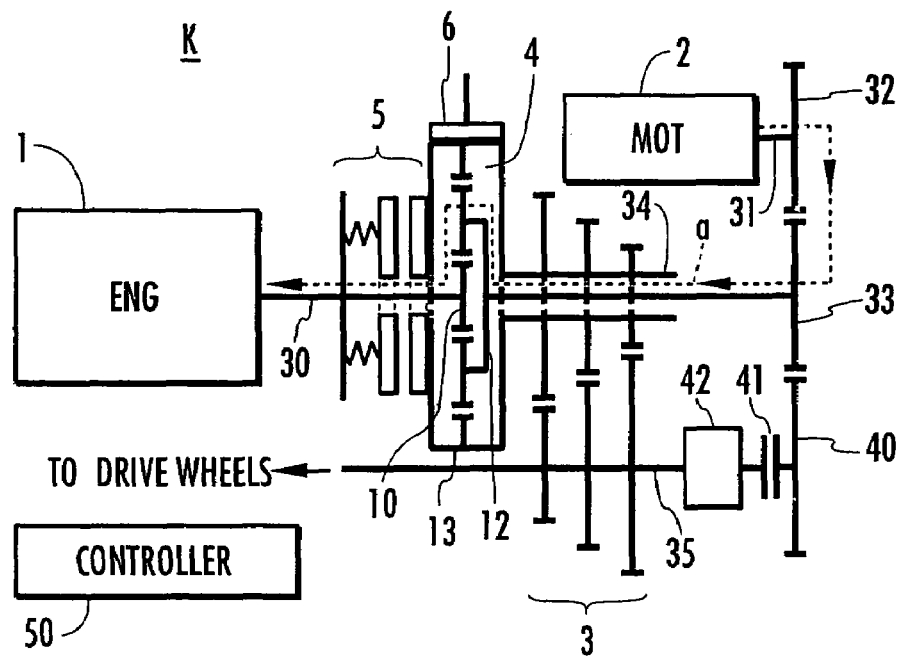
FIGS. 2A and 2B are operation explanatory diagrams of an engine start mode.
Figure 2:
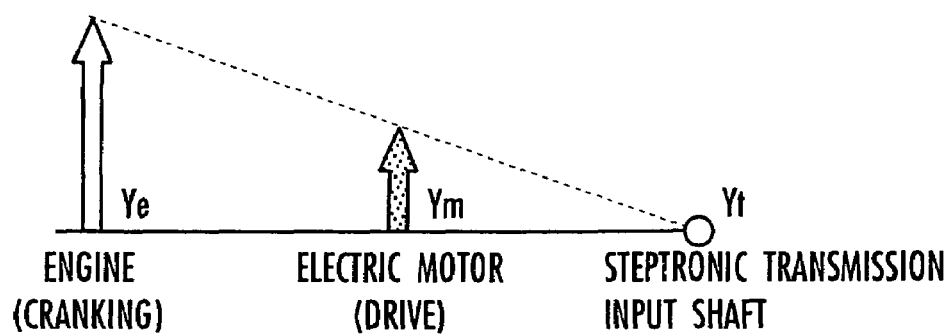
Figure 3:
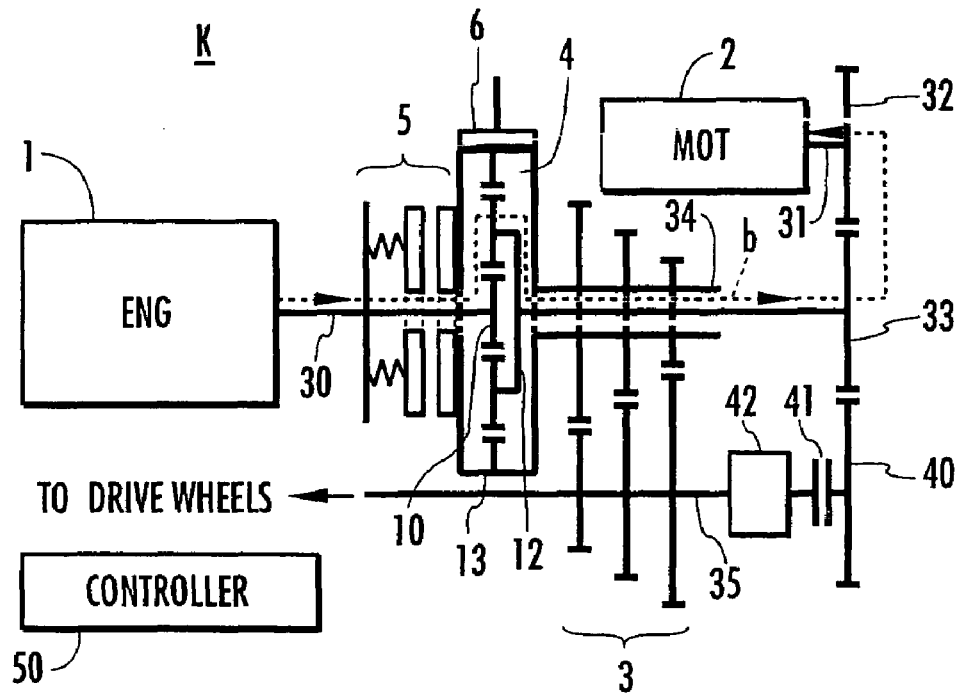
FIGS. 3A and 3B are operation explanatory diagrams of a power generation mode.
Figure 3:
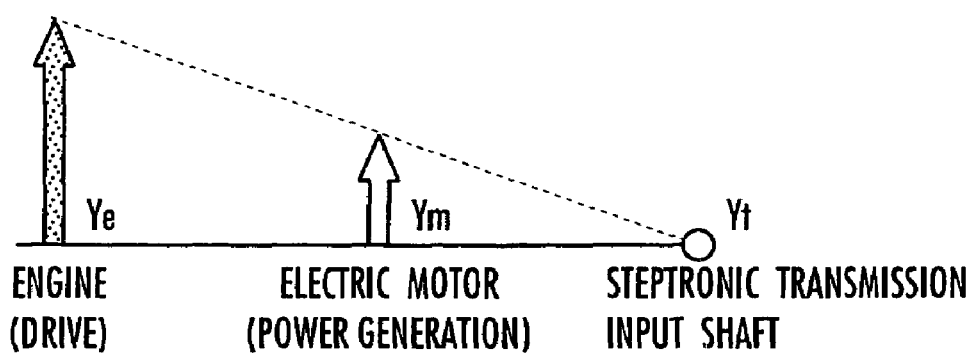
Figure 4:
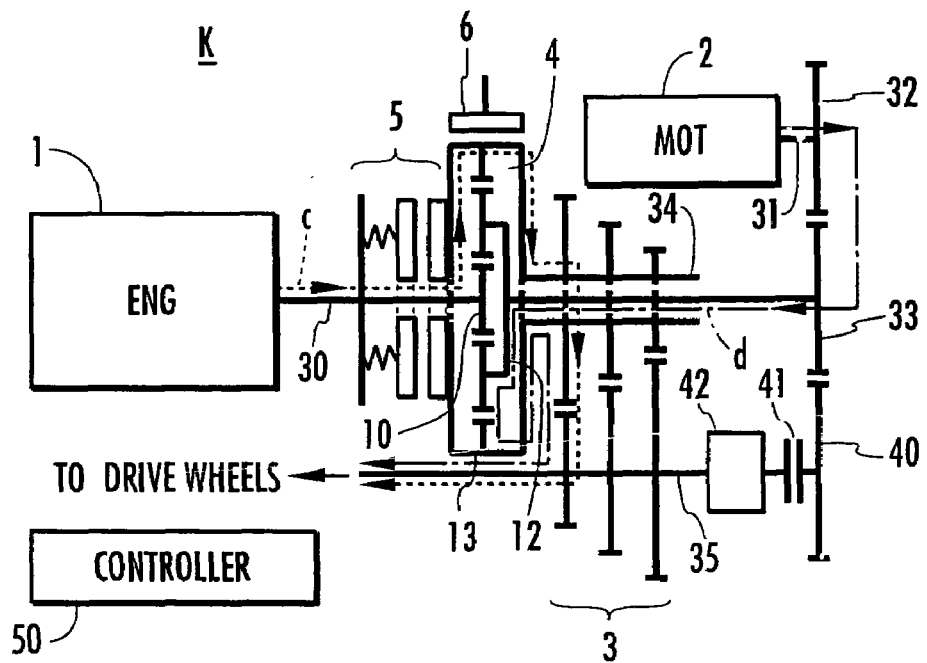
FIGS. 4A and 4B are operation explanatory diagrams of a driving force assist mode.
Figure 4:
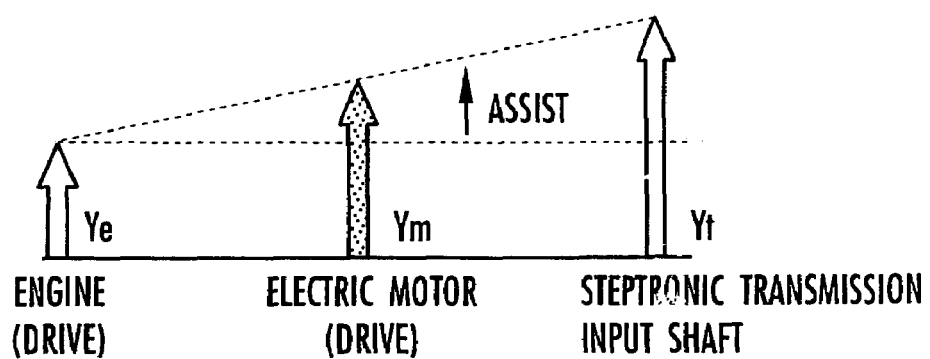
Figure 5:
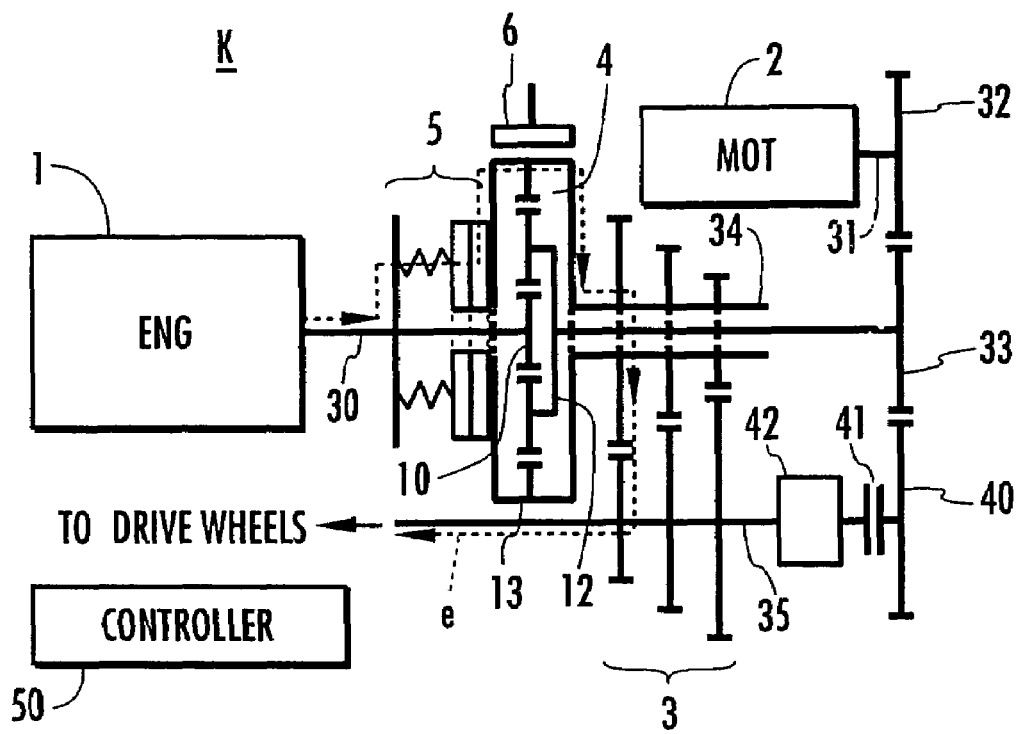
FIGS. 5A and 5B are operation explanatory diagrams of an engine running mode.
Figure 5:
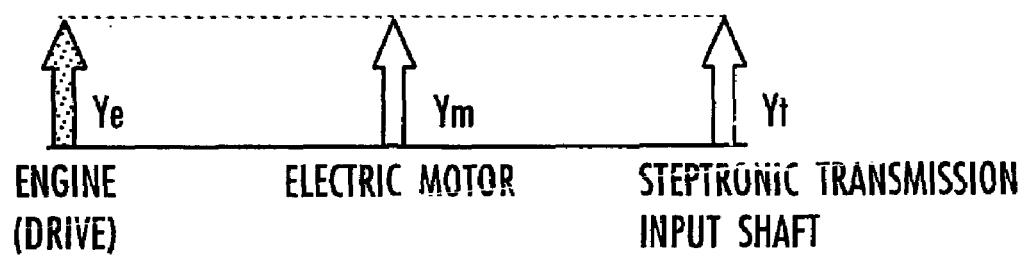
Figure 6:
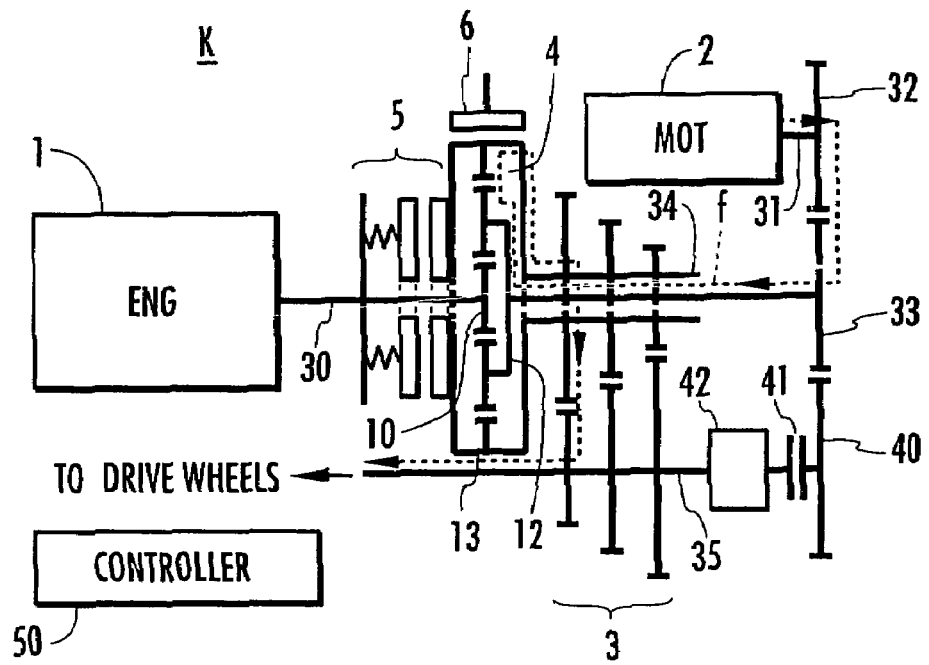
FIGS. 6A and 6B are operation explanatory diagrams of a motor running mode.
Figure 6:
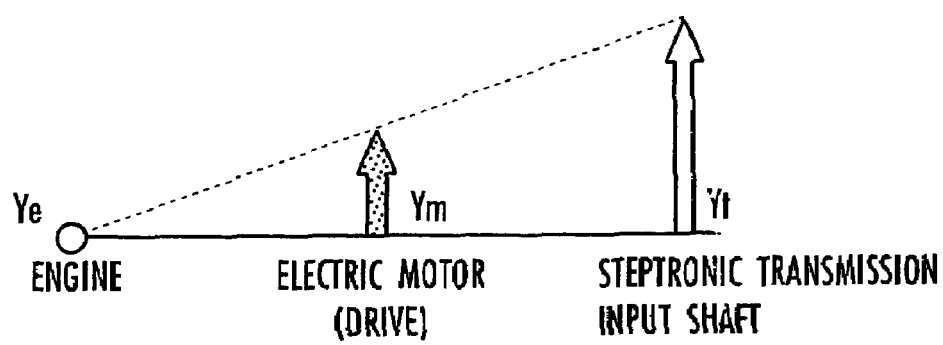
Figure 7:
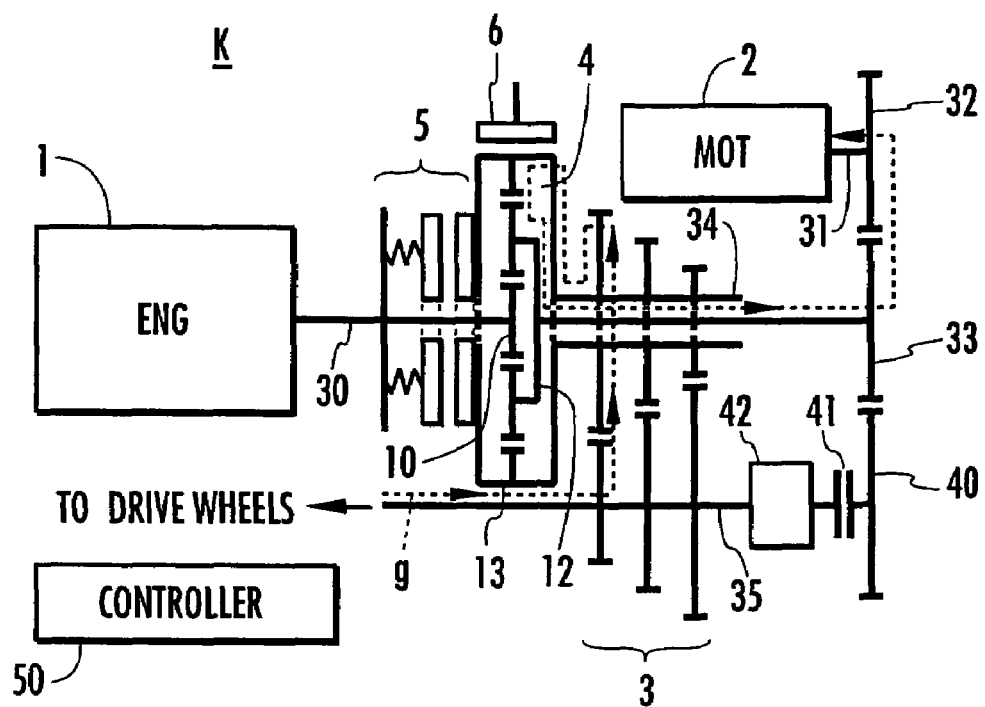
FIGS. 7A and 7B are operation explanatory diagrams of a regeneration mode.
Figure 7:
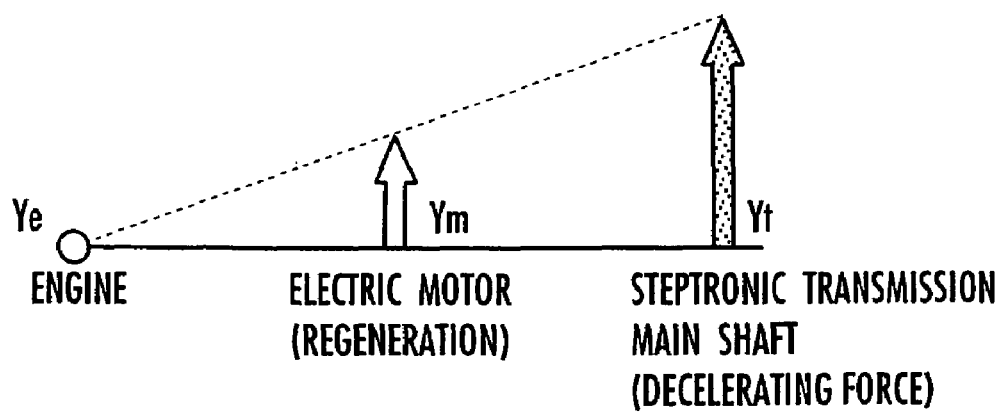
Figure 8:
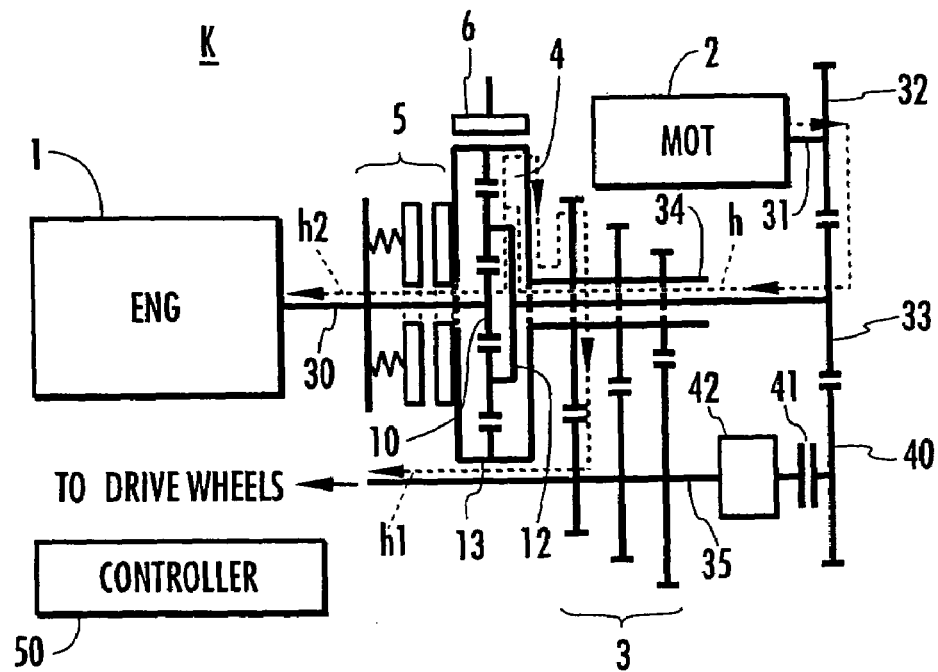
FIGS. 8A and 8B are operation explanatory diagrams of an engine restart mode.
Figure 8:
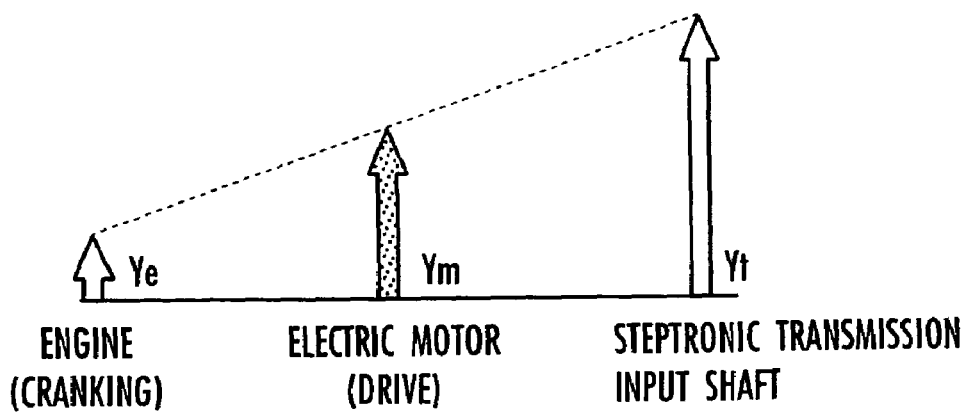
Figure 9:
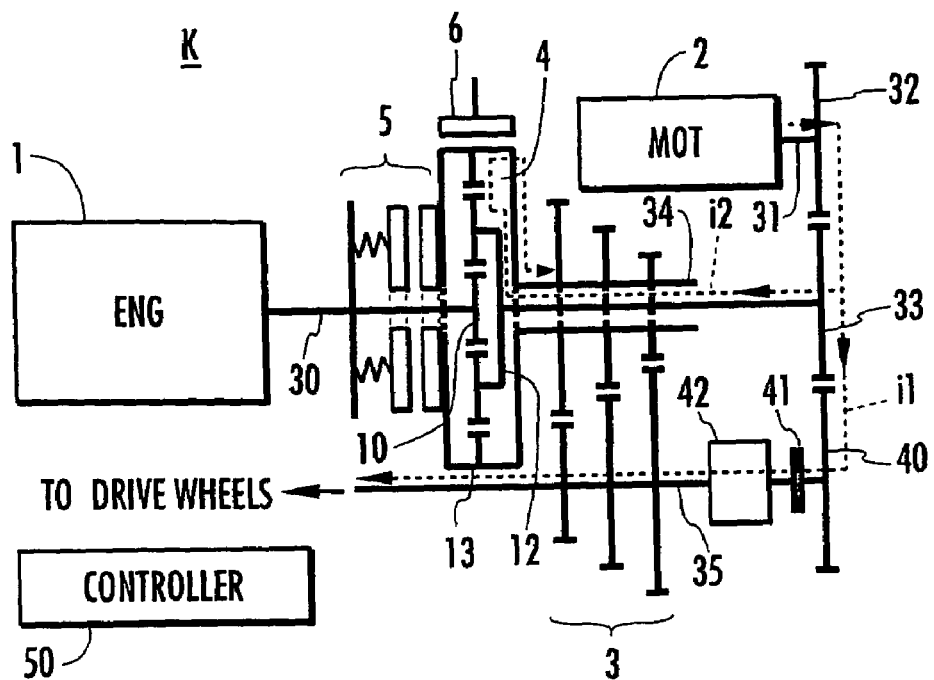
FIGS. 9A and 9B are operation explanatory diagrams of a speed change driving force complementary mode.
Figure 9:
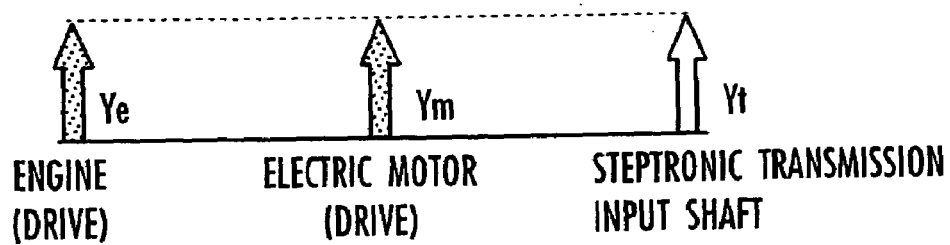
Figure 10:
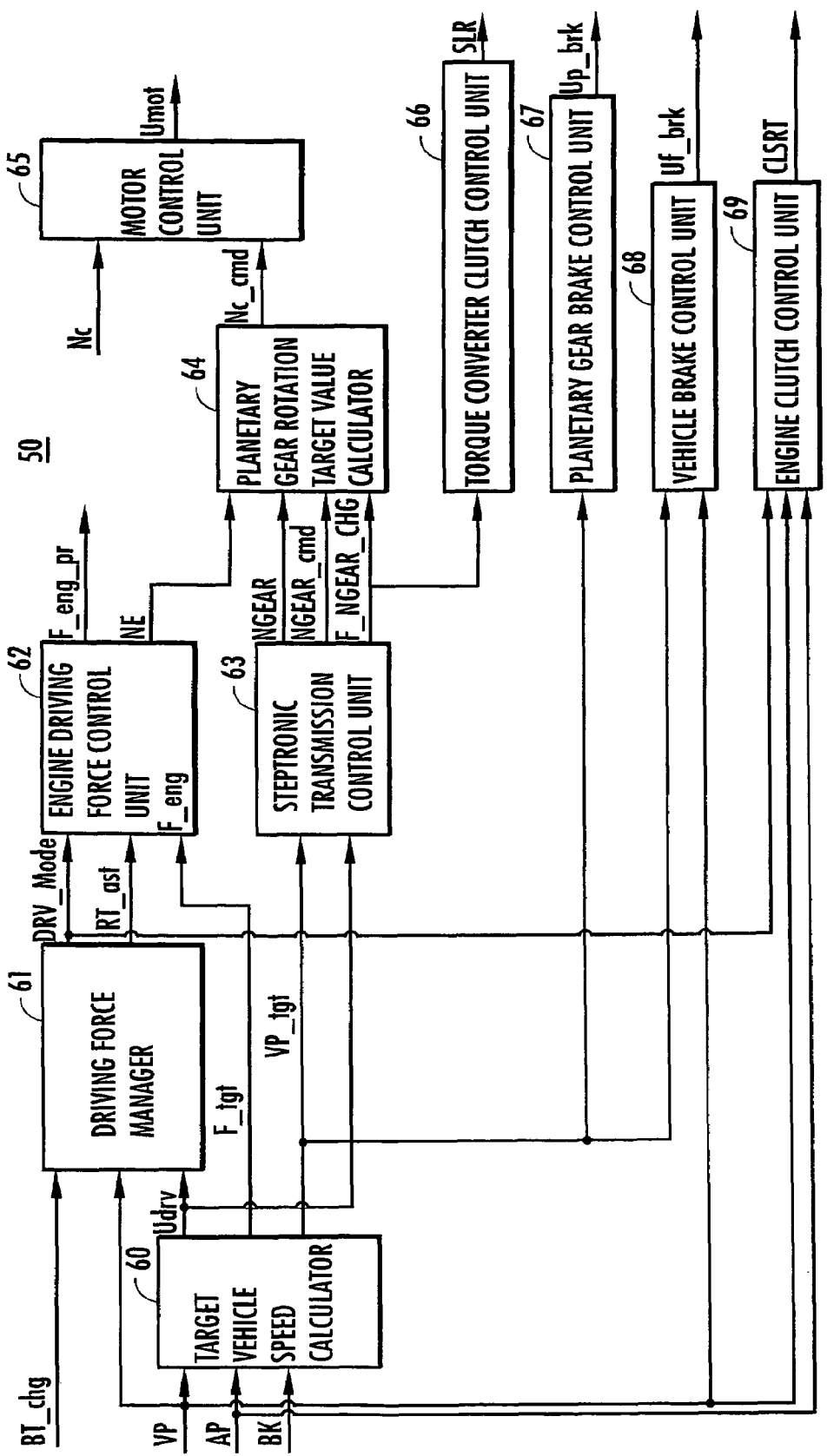
FIG. 10 is a control block diagram of a controller.
Figure 12:
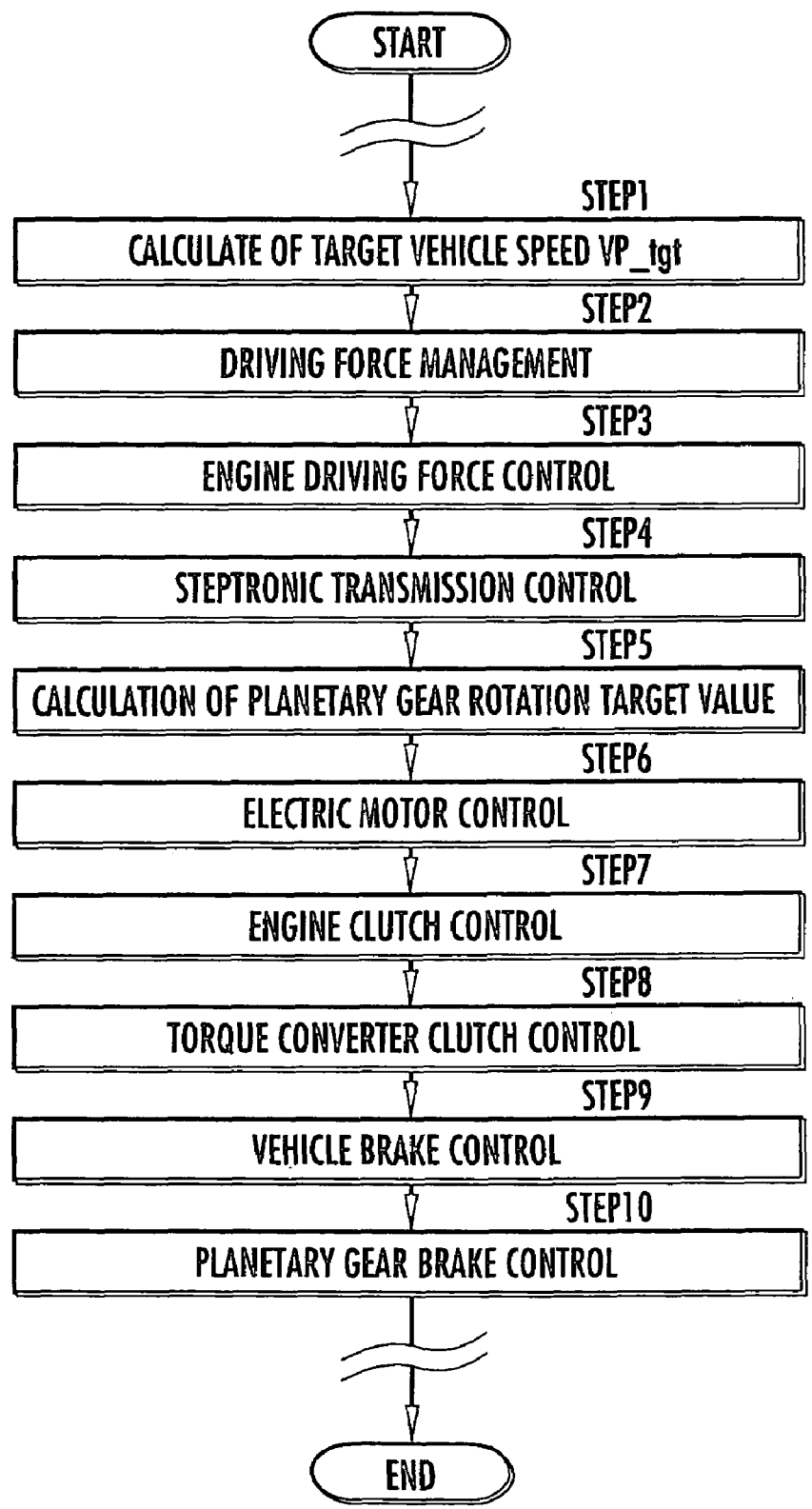
FIG. 12 is an operation flowchart of the controller.
Figure 13:
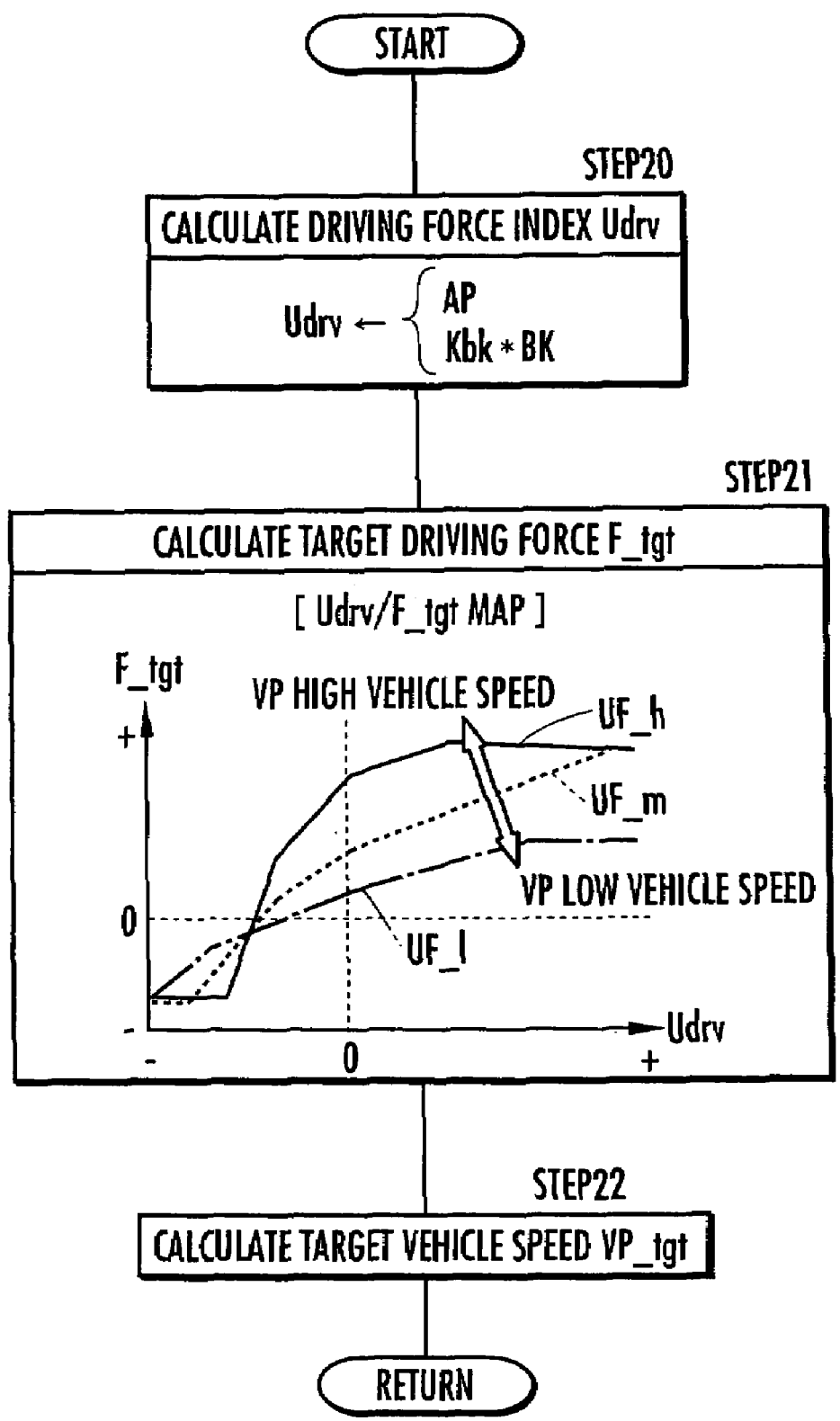
FIG. 13 is a flowchart of processing for calculating a target vehicle speed.
Figure 14:
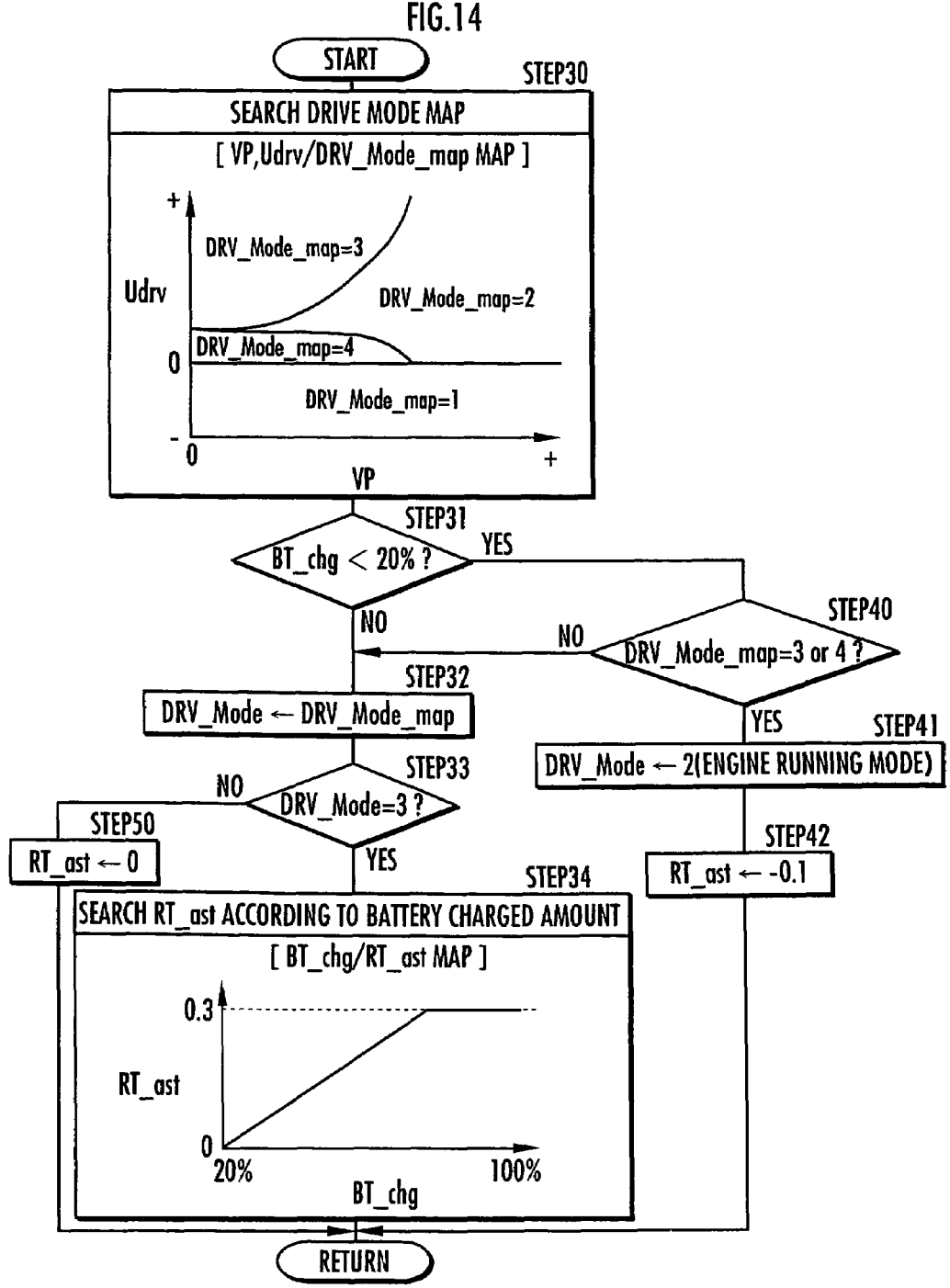
FIG. 14 is a flowchart of driving force management processing.
Figure 15:
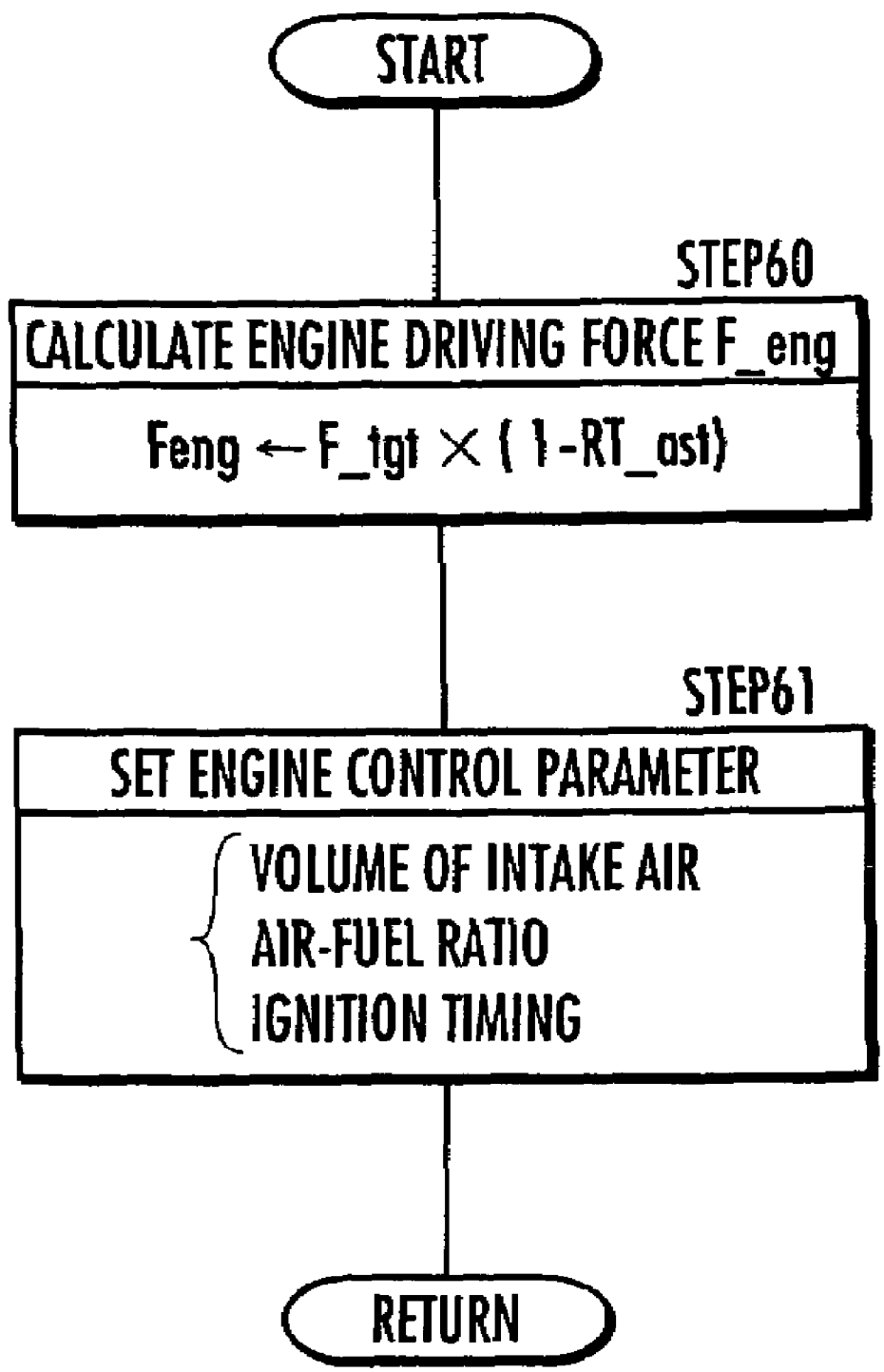
FIG. 15 is a flowchart of engine driving force control.
Figure 16:
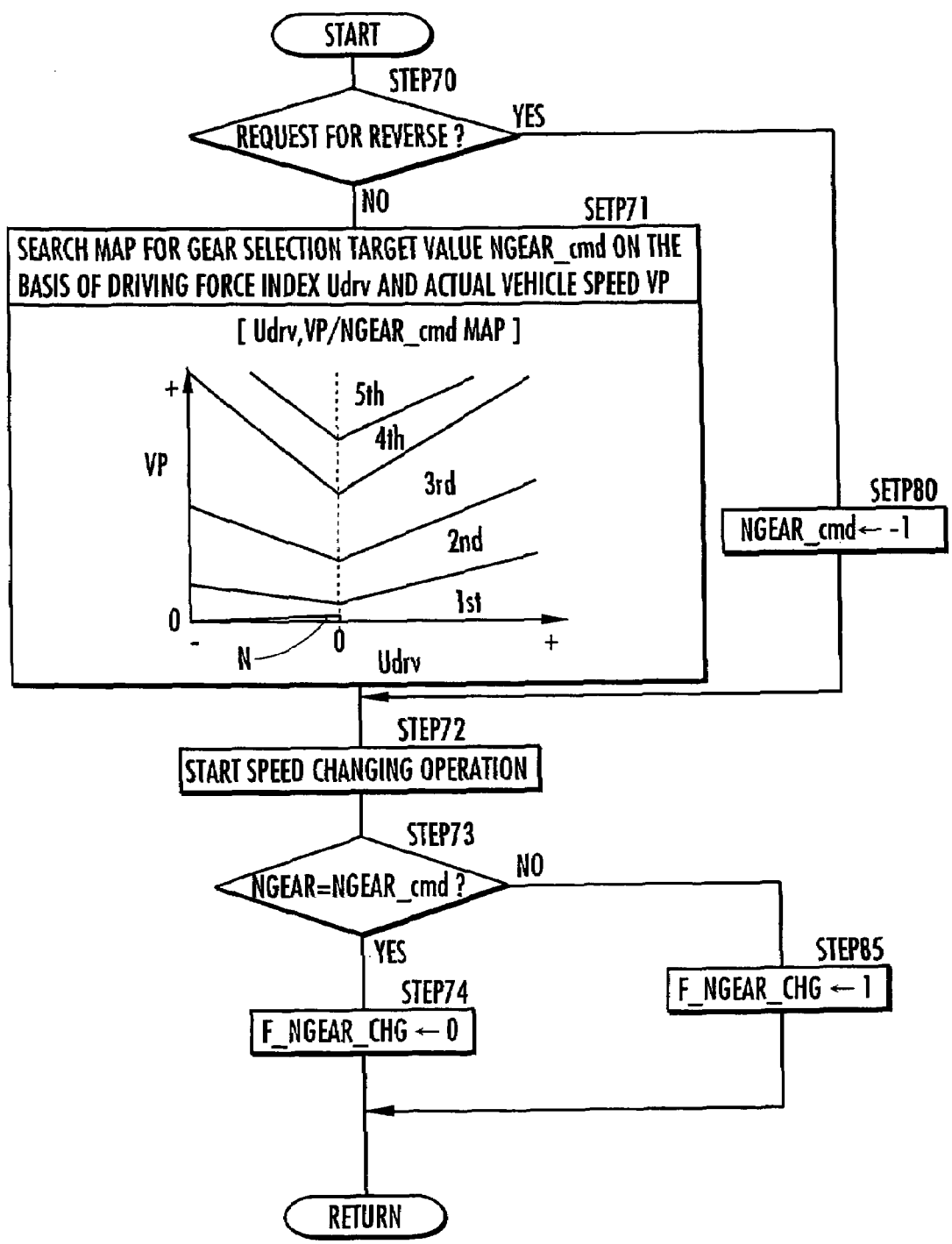
FIG. 16 is a flowchart of a STEPTRONIC™ transmission control.
Figure 17:
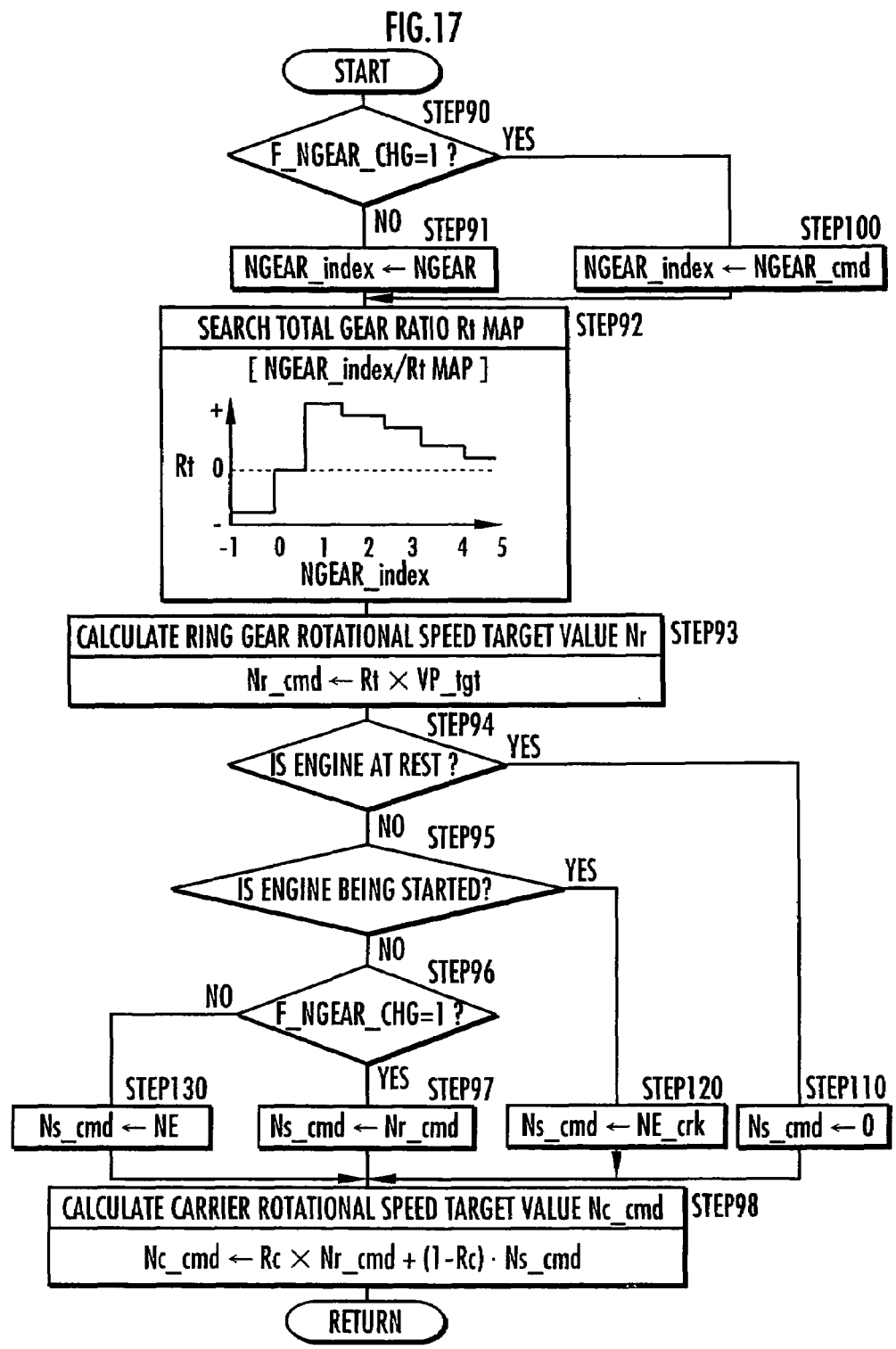
FIG. 17 is a flowchart of processing for calculating a target value of the rotation of a planetary gear.
Figure 18:
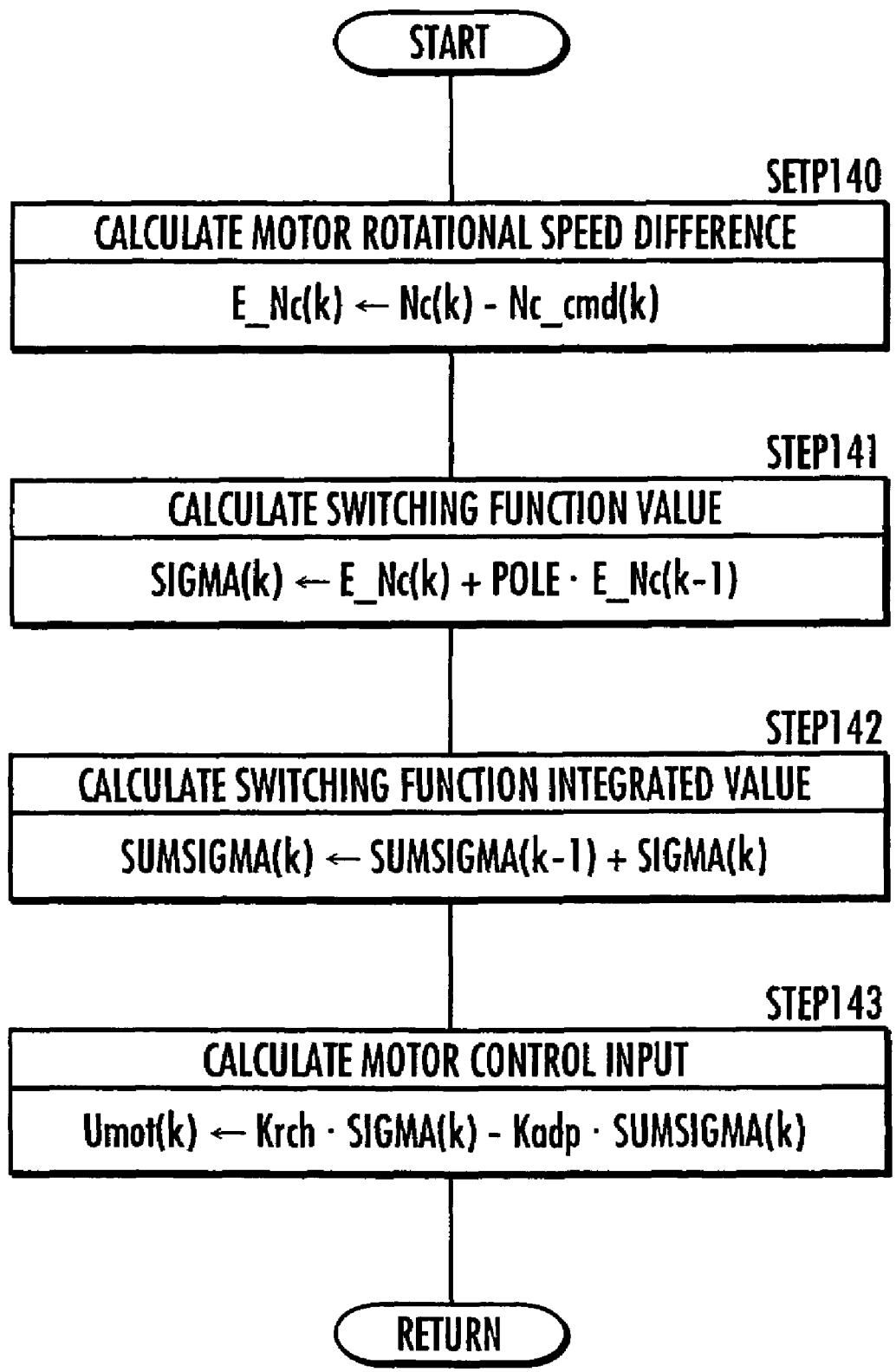
FIG. 18 is a flowchart of motor control.
Figure 19:
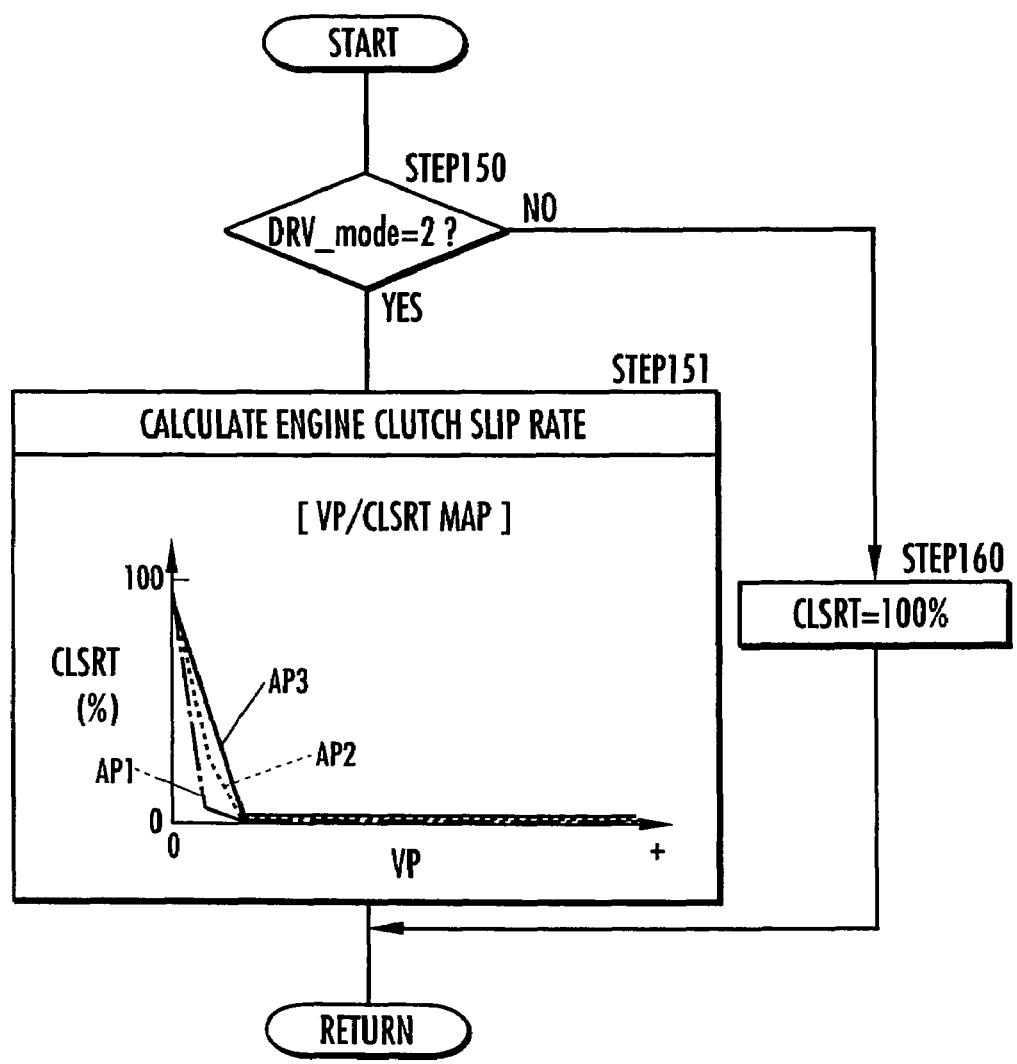
FIG. 19 is a flowchart of engine clutch control.
Figure 20:
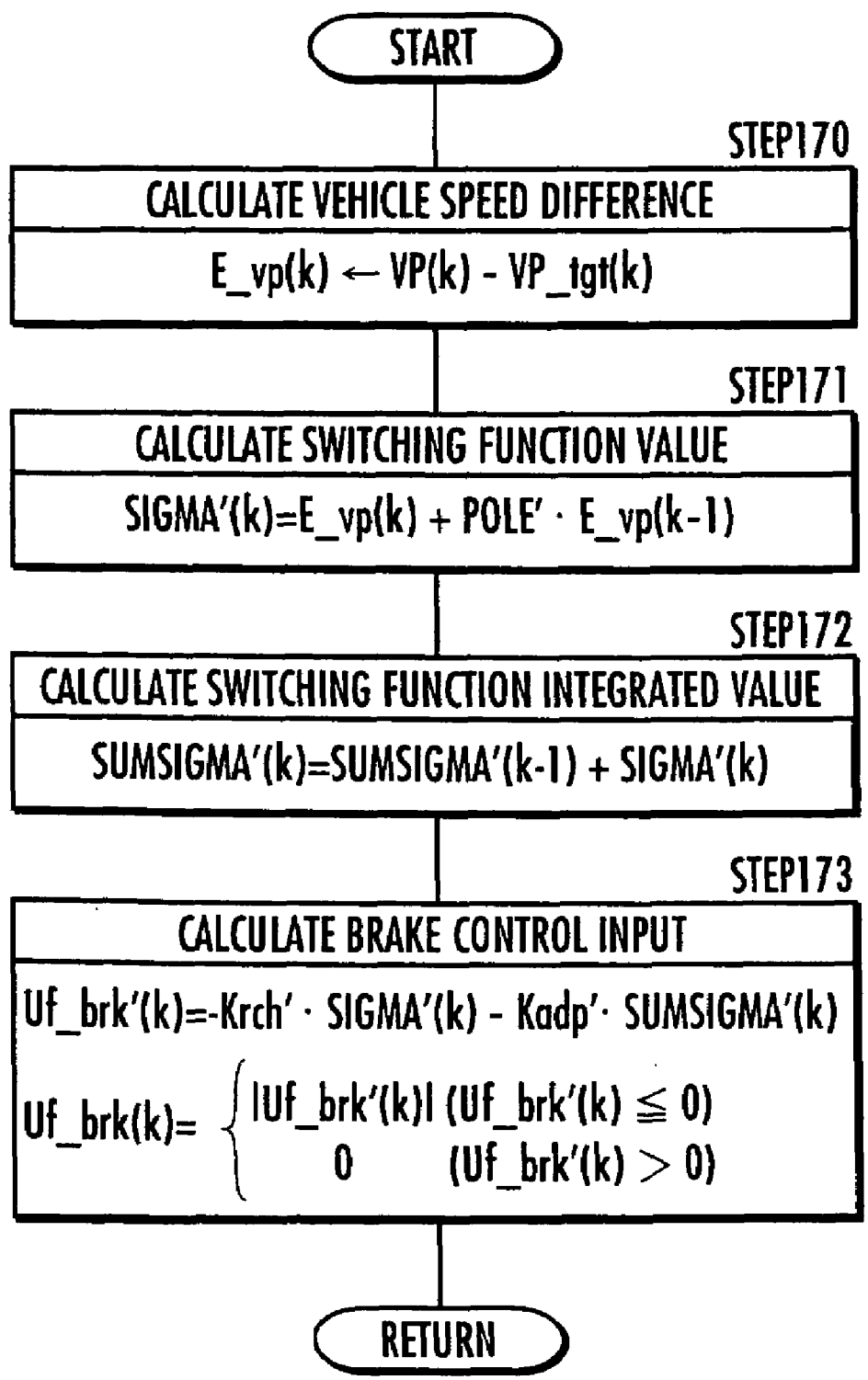
FIG. 20 is a flowchart of vehicle brake control.
Figure 21:
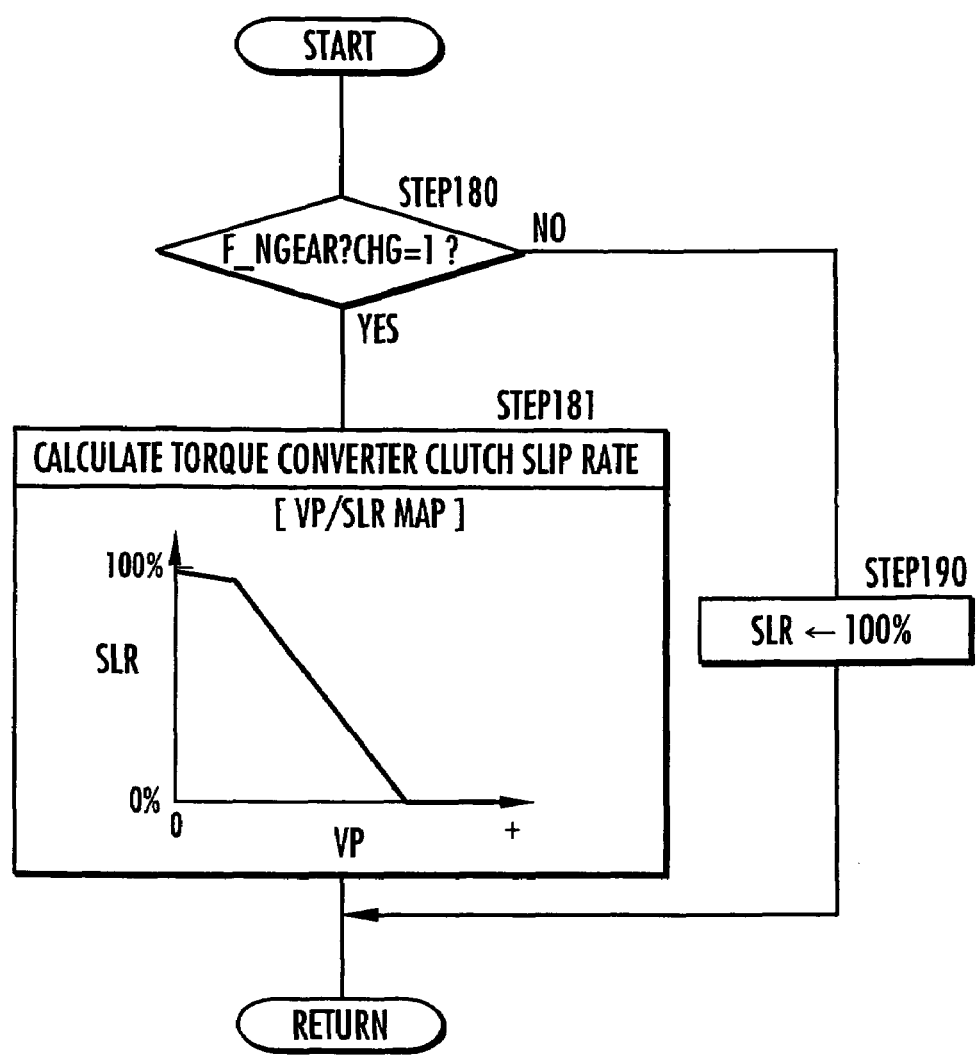
FIG. 21 is a flowchart of torque converter clutch control.
Figure 22:
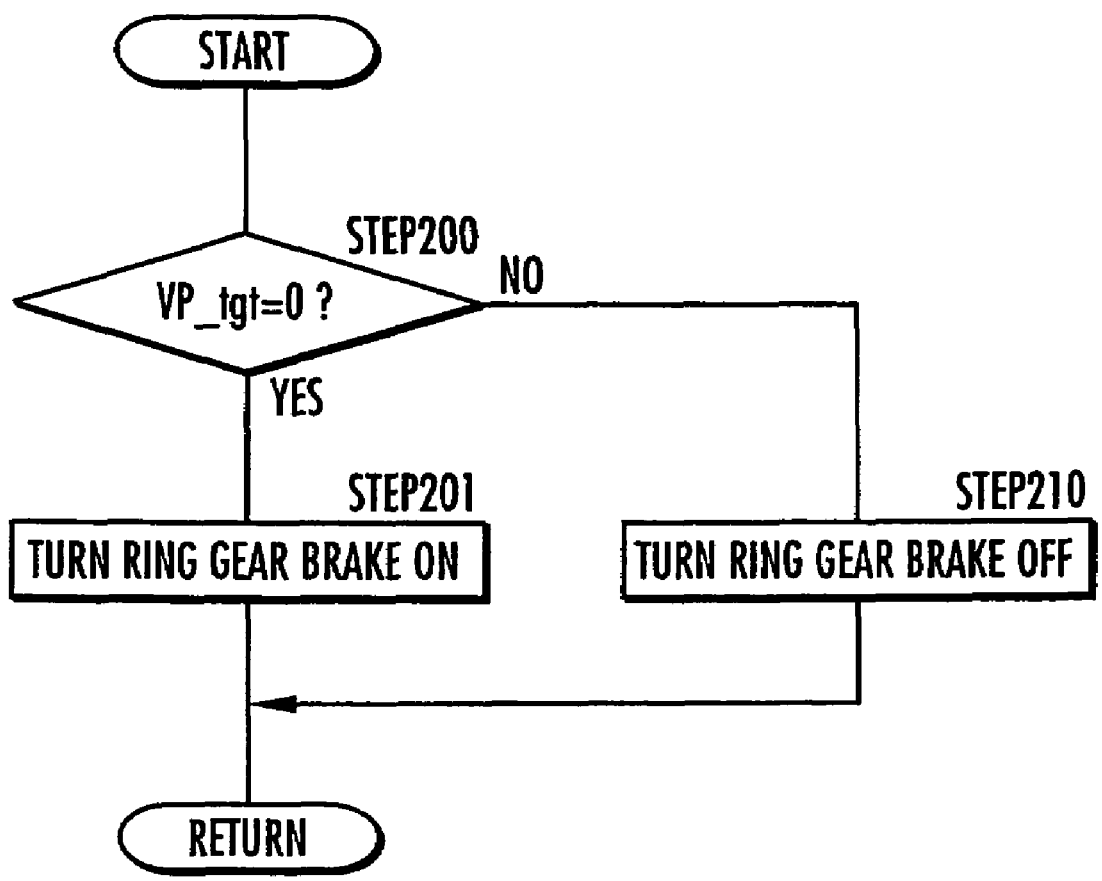
FIG. 22 is a flowchart of planetary gear brake control.
Figure 23:
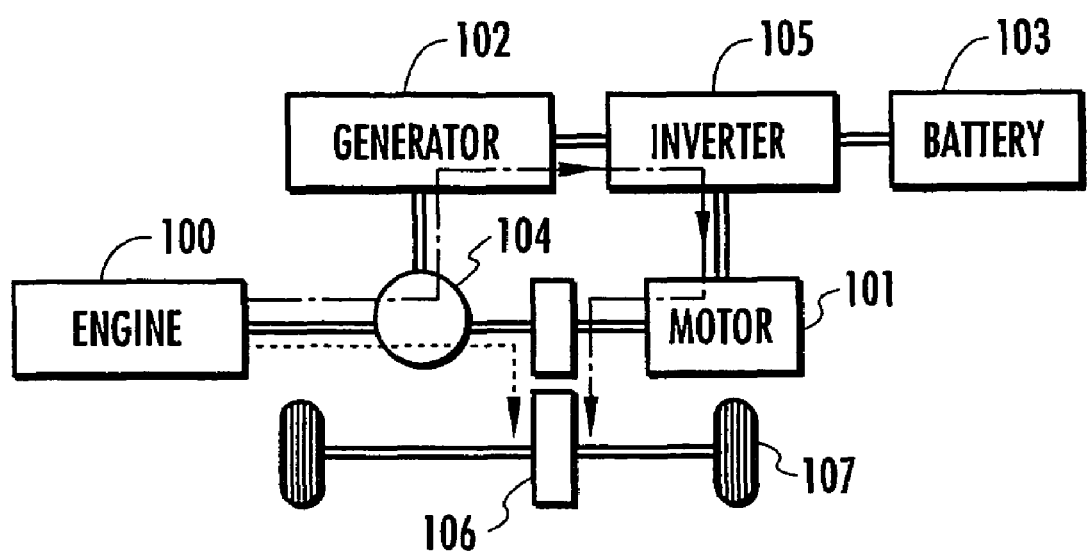
FIG. 23 is a block diagram showing a conventional hybrid vehicle.

An embodiment of the present invention will be described with reference to FIG. 1 through FIG. 22. FIG. 1A is a general block diagram of a drive system in accordance with the present invention, and FIG. 1B is a cross-sectional view of a planetary gear assembly; FIGS. 2A and 2B are operation explanatory diagrams of an engine start mode; FIGS. 3A and 3B are operation explanatory diagrams of a power generation mode; FIGS. 4A and 4B are operation explanatory diagrams of a driving force assist mode; FIGS. 5A and 5B are operation explanatory diagrams of an engine running mode; FIGS. 6A and 6B are operation explanatory diagrams of a motor running mode; FIGS. 7A and 7B are operation explanatory diagrams of a regeneration mode; FIGS. 8A and 8B are operation explanatory diagrams of an engine restart mode; FIGS. 9A and 9B are operation explanatory diagrams of a speed change driving force complementary mode; FIG. 10 is a control block diagram of a controller; FIGS. 11A through 11D are explanatory diagrams of an operation example of the drive system; FIG. 12 is an operation flowchart of the controller; FIG. 13 is a flowchart of processing for calculating a target vehicle speed; FIG. 14 is a flowchart of driving force management processing; FIG. 15 is a flowchart of engine driving force control; FIG. 16 is a flowchart of a STEPTRONIC™ transmission control; FIG. 17 is a flowchart of processing for calculating a target value of the rotation of a planetary gear; FIG. 18 is a flowchart of motor control; FIG. 19 is a flowchart of engine clutch control; FIG. 20 is a flowchart of vehicle brake control; FIG. 21 is a flowchart of torque converter clutch control; and FIG. 22 is a flowchart of planetary gear brake control.

Referring first to FIG. 1, the construction of the drive system according to the present invention will be explained. Referring to FIG. 1A, a drive system K in accordance with the present invention is constructed of an engine 1 corresponding to a motive power source in the present invention, an electric motor 2 corresponding to an electric drive source in the present invention, and a STEPTRONIC™ transmission 3 corresponding to a transmission in the present invention, which are mechanically combined through the intermediary of a planetary gear assembly 4. The drive system K is installed in a hybrid vehicle, which corresponds to a movable body in the present invention, and drives drive wheels (not shown) by actuating the engine 1 and the electric motor 2 in cooperation.

FIG. 1B is a cross-sectional view of the planetary gear assembly 4 observed from the engine 1 side. The planetary gear assembly 4 has a sun gear 10 rotating about the center of a central shaft, three planetary pinion gears 11 (11a, 11b and 11c) rotating about the center of the central shaft while rotating on its axis in engagement with teeth 20 formed on the outer circumference of the sun gear 10, a ring gear 13 having teeth 22 formed on the inner circumference that rotate, meshing with teeth 21 (21a, 21b and 21c) formed on the outer periphery of the planetary pinion gear 11, and a carrier 12 that rotatably supports the three planetary pinion gears 11 and moves about the center of the central shaft.

The planetary gear assembly 4 is characterized in that, if the numbers of revolutions of two rotating elements out of the three rotating elements in the present invention, namely, the sun gear 10, the carrier 12 and the ring gear 13 are determined, then the rotational speed of the remaining rotating element is uniquely determined (the working principle of a planetary gear assembly).

Referring to FIG. 1A, an output shaft 30 of the engine 1 is connected to the sun gear 10 of the planetary gear assembly 4, an input/output shaft 31 of the electric motor 2 is connected to the carrier 12 of the planetary gear assembly 4 through the intermediary of a gear 32 and a gear 33, and an input shaft 34 of the STEPTRONIC™ transmission 3 is connected to the ring gear 13 of the planetary gear assembly 4. The gear ratio of the gear 32 to the gear 33 is 1:1, and the rotational speed of the electric motor 2 will be equal to the numbers of revolutions of the ring gear 13 and the input shaft 34 of the STEPTRONIC™ transmission 3.

Referring to FIG. 1A, the drive system K has an engine clutch 5 (corresponding to a motive power connecting/disconnecting means in the present invention) for directly coupling the output shaft 30 of the engine 1 and the input shaft 34 of the STEPTRONIC™ transmission 3, a ring gear brake 6 (corresponding to a rotation regulating means in the present invention) for regulating the rotation of the ring gear 13, a torque converter 42 for transmitting a driving output of the electric motor 2 to the output shaft 35 of the STEPTRONIC™ transmission 3 through the intermediary of the gear 32, the gear 33, and the gear 40, and a torque converter clutch 41 for switching between ON and OFF of the driving force transmitted to the torque converter 42. The torque converter 42 and the torque converter clutch 41 constitute a driving force transmitting means in the present invention.

The input shaft 34 of the STEPTRONIC™ transmission 3 is provided with a train of input gears 36a, 37a and 38a. The output shaft 35 of the STEPTRONIC™ transmission 3 is provided with a train of output gears 36b, 37b and 38b meshed with the train of input gears 36a, 37a and 38a, respectively. The output shaft 35 includes a plurality of synchromesh mechanisms 36c, 37c and 38c thereon. Each synchromesh mechanism 36c, 37c and 38c is configured to perform gear ratio selection, e.g., by disconnecting the driving force between the output shaft 35 and the output gears 36b or 37b or 38b in order to transmit the driving force from the input shaft 34 of the transmission to the output shaft 35, by the appropriate one of the following input/output gears 36a, 36b, or 37a, 37b or 38a, 38b, which corresponds to the selected gear ratio. For example, to change a gear ratio of the STEPTRONIC™ transmission 3, when the transmission 3 is to change from gear 36 to gear 37, a first synchromesh mechanism 36c disengages the output gear 36b from the output shaft 35, and a second synchromesh mechanism 37c engages the output gear 37b to the output shaft 35, thereby changing the gear ratio. Similarly, when the transmission 3 is to change from gear 37 to gear 38, the second synchromesh mechanism 37c disengages the output gear 37b from the output shaft 35, and a third synchromesh mechanism 38c engages the output gear 38b to the output shaft 35, thereby changing the gear ratio. While the manner in which the gears are changed does not differ, it is within the spirit and scope of the present invention to alter the order of the changing gears, e.g., from gear 36 to gear 38. Also, other mechanisms, such as a dog clutch, but not limited thereof can be used to perform the gear ratio selection. The operations of the engine 1, the electric motor 2, the STEPTRONIC™ transmission 3, the engine clutch 5, the ring gear brake 6, and the torque converter clutch 41 are controlled by control signals issued from a controller 50 comprised of a microcomputer or the like.

Referring now to FIG. 2 through FIG. 9, operation modes that can be implemented by the drive system K will be explained.

Referring first to FIG. 2, the operation of the drive system K in an "engine start mode" for starting the engine 1 by the electric motor 2 will be described. As shown in FIG. 2A, the controller 50 turns the ring gear brake 6 on to disable the rotation of the ring gear 13 in the engine start mode. This causes the output shaft 30 of the engine 1 connected to the sun gear 10 to be drivingly connected with the input/output shaft 31 of the electric motor 2 connected to the carrier 12 through the intermediary of the gear 33 and the gear 32.

In this state, the controller 50 sets the STEPTRONIC™ transmission 3 to a neutral position and actuates the electric motor 2. This causes a driving force output from the electric motor 2 to be transmitted to the output shaft 30 of the engine 1 through the intermediary of the planetary gear assembly 4 along the path denoted by "a" in FIG. 2A, making it possible to crank the engine 1.

FIG. 2B is a diagram in which the numbers of revolutions of the output shaft 30 of the engine 1, the input/output shaft 31 of the electric motor 2, and the input shaft 34 of the STEPTRONIC™ transmission 3 are indicated in terms of lengths Ye, Ym and Yt of the axis of ordinates. The numbers of revolutions of these three rotating shafts have a relationship in which they are positioned on a straight line formed by connecting the apexes of the shafts according to the working principle of the planetary gear assembly 4 described above.

In the engine start mode, a rotational speed Yt of the input shaft 34 of the STEPTRONIC™ transmission 3 connected to the ring gear 13 whose rotation has been disabled will be zero. Hence, a rotational speed Ye of the engine 1 will be determined by a rotational speed Ym of the electric motor 2.

Referring now to FIG. 3, a description will be given of the operation of the drive system K in a "power generation mode" in which the electric motor 2 is rotated by the driving force of the engine 1 to make the electric motor 2 work as a generator. As in the engine start mode described above, in the power generation mode also, the controller 50 turns the ring gear brake on to disable the rotation of the ring gear 13 so as to cause the output shaft 30 of the engine 1 connected to the sun gear 10 to be drivingly connected to the input/output shaft 31 of the electric motor 2 connected to the carrier 12 through the intermediary of the gear 33 and the gear 32 and to rotate, as shown in FIG. 3A.

In this state, the controller 50 sets the STEPTRONIC™ transmission 3 to the neutral position and actuates the engine 1. This causes the driving force output from the engine 1 to be transmitted to the input/output shaft 31 of the electric motor 2 through the intermediary of the planetary gear assembly 4 along the path indicated by "b" in FIG. 3B, making it possible to generate power by rotating the electric motor 2.

FIG. 3B is a diagram in which the numbers of revolutions of the output shaft 30 of the engine 1, the input/output shaft 31 of the electric motor 2, and the input shaft 34 of the STEPTRONIC™ transmission 3 are indicated in terms of lengths Ye, Ym and Yt of the axis of ordinates, as in FIG. 2B. In the power generation mode, the rotational speed Yt of the input shaft 34 of the STEPTRONIC™ transmission 3 connected to the ring gear 13 whose rotation has been disabled will be zero, so that the rotational speed Ym of the electric motor 2 will be determined by the rotational speed Ye of the engine 1.

Referring now to FIG. 4, a description will be given of the operation of the drive system K in a "driving force assist mode" in which the input shaft 34 of the STEPTRONIC™ transmission 3 is rotatively driven by the driving force of the engine 1 and the driving force of the electric motor 2. As shown in FIG. 4A, in the driving force assist mode, the controller 50 turns the ring gear brake 6 off to set the ring gear 13 to be rotatable.

In this state, actuating the engine 1 and the electric motor 2 together causes the driving force of the engine 1 to be transmitted to the sun gear 10 of the planetary gear assembly 4 connected to the output shaft 30 of the engine 1 along the path indicated by "c" in FIG. 4A. The driving force of the electric motor 2 is transmitted to the carrier 12 of the planetary gear assembly 4 connected to the input/output shaft 31 of the electric motor 2 through the intermediary of the gear 32 and the gear 33 along the path indicated by "d" in FIG. 4A.

According to the working principle of the planetary gear assembly 4 described above, the rotational speed of the ring gear 13 of the planetary gear assembly 4 is determined on the basis of the numbers of revolutions of the sun gear 10 and the carrier 12. Therefore, actuating the engine 1 and the electric motor 2 together allows the controller 50 to actuate the STEPTRONIC™ transmission 3 by adding the driving force of the electric motor 2 to the driving force of the engine 1. This makes it possible to apply the torque that cannot be obtained by actuating the engine 1 alone to the input shaft 34 of the STEPTRONIC™ transmission 3.

FIG. 4B is a diagram showing the numbers of revolutions of the output shaft 30 of the engine 1, the input/output shaft 31 of the electric motor 2, and the input shaft 34 of the STEPTRONIC™ transmission 3 in terms of lengths of the axes of ordinates Ye, Ym and Yt. In the driving force assist mode, the rotational speed Yt of the input shaft 34 of the STEPTRONIC™ transmission 3 is determined on the basis of the numbers of revolutions Ye and Ym of the two drive sources, the engine 1 and the electric motor 2, respectively.

Referring now to FIG. 5, a description will be given of the operation of the drive system K in an "engine running mode" in which the engine 1 is directly coupled to the STEPTRONIC™ transmission 3 to cause the hybrid vehicle to travel only from the driving force of the engine 1. As shown in FIG. 5A, in the engine running mode, the controller 50 turns the engine clutch 5 on to connect the output shaft 30 of the engine 1 to the ring gear 13 of the planetary gear assembly 4. Thus, the controller 50 directly connects the output shaft 30 of the engine 1 to the input shaft 31 of the STEPTRONIC™ transmission 3.

In the state described above, the controller 50 sets the STEPTRONIC™ transmission 3 to a predetermined gear ratio, and the rotational speed of the engine 1 is controlled so that the numbers of revolutions of the carrier 12 and the sun gear 10 coincide with each other. This causes the driving force of the electric motor 2 to be zero, allowing the hybrid vehicle to travel only from the driving force of the engine 1 transmitted along the path denoted by "e" in FIG. 5A. When the hybrid vehicle starts moving, controlling the slip rate of the engine clutch 5 makes it possible to control the driving force at a moving start or implement creep travel.

Strictly speaking, if the driving force of the electric motor 2 is set to zero, then loss in the driving force is incurred due to friction or the like of the planetary gear assembly 4 or the electric motor 2. Alternatively, therefore, the input/output shaft 31 of the electric motor 2 may be disengaged from the planetary gear assembly 4 by a clutch or the like, or the electric motor 2 may be actuated to cancel out the aforementioned loss in the driving force. It is also possible to actuate the electric motor 2 with the engine 1 actuated by turning the engine clutch 5 on thereby to assist the driving force of the engine 1 with the driving force of the electric motor FIG. 5B is a diagram showing the numbers of revolutions of the output shaft 30 of the engine 1, the input/output shaft 31 of the electric motor 2, and the input shaft 34 of the STEPTRONIC™ transmission 3 in terms of lengths of the axes of ordinates Ye, Ym and Yt. In the engine running mode, the rotational speed Ye of the engine 1, the rotational speed Ym of the electric motor 2, and the rotational speed Yt of the input shaft of the STEPTRONIC™ transmission 3 are equal.

Referring now to FIG. 6, a description will be given of the operation of the drive system K in a "motor running mode" in which the hybrid vehicle travels only from the driving force of the electric motor 2. As shown in FIG. 6A, in the motor running mode, the controller 50 turns the engine clutch 5 off and sets the STEPTRONIC™ transmission 3 at a predetermined gear ratio. In this case, the rotational speed of the input shaft 34 of the STEPTRONIC™ transmission 3 (=a rotational speed Nr of the ring gear 13 of the planetary gear assembly 4) is determined on the basis of the speed of the hybrid vehicle.

Based on the rotational speed Nr of the ring gear 13, the controller 50 determines a rotational speed Nc of the carrier 12 of the planetary gear assembly 4 so that a rotational speed Ns of the sun gear 10 becomes zero according to equations (1) and (2) given below:

$$Gr:Gs = 1:Rs \quad (1)$$

where Gr: Number of teeth of the ring gear; Gs: Number of teeth of the sun gear; and Rs: Gear ratio of the ring gear to the sun gear.

$$Nc = \frac{1}{1+Rs} \cdot Nr = Rc \cdot Nr \quad (2)$$

where Nc: Number of revolutions of the carrier; Nr: Number of revolutions of the ring gear; and Rc: Gear ratio of the carrier to the ring gear.

Thus, in the state wherein the engine 1 is stopped according to the differential principle of the planetary gear assembly 4, only the driving force of the electric motor 2 is transmitted to the drive wheels along a path denoted by "f" in FIG. 6A so as to allow the hybrid vehicle to travel.

FIG. 6B is a diagram showing the numbers of revolutions of the output shaft 30 of the engine 1, the input/output shaft 31 of the electric motor 2, and the input shaft 34 of the STEPTRONIC™ transmission 3 in terms of lengths of the axes of ordinates Ye, Ym and Yt. In the motor running mode, the rotational speed Ye of the engine 1 becomes zero, so that the rotational speed Yt of the input shaft 34 of the STEPTRONIC™ transmission 3 is determined on the basis of the rotational speed Ym of the electric motor 2.

Referring now to FIG. 7, a description will be given of the operation of the drive system K in a "regeneration mode" in which the electric motor 2 is run by a decelerating force transmitted to the input shaft 34 of the STEPTRONIC™ transmission 3 to recover generated electric power when the hybrid vehicle is decelerated.

As shown in FIG. 7A, in the regeneration mode, the controller 50 turns the engine clutch 5 off and sets the STEPTRONIC™ transmission 3 at a predetermined gear ratio. As in the motor running mode described above, the electric motor 2 is controlled to satisfy the aforesaid equation (2). This allows the controller 50 to stop the running of the engine 1 so as to restrain the deceleration energy from being consumed due to the loss attributable to the running of the engine 1. With this arrangement, the deceleration energy can be transmitted to the electric motor 2 along a path indicated by "g" in FIG. 7A and the deceleration energy can be converted into electric energy to be collected.

FIG. 7B is a diagram showing the numbers of revolutions of the output shaft 30 of the engine 1, the input/output shaft 31 of the electric motor 2, and the input shaft 34 of the STEPTRONIC™ transmission 3 in the regeneration mode in terms of lengths of the axes of ordinates Ye, Ym and Yt. In the regeneration mode, the rotational speed Ye of the engine 1 will be zero, so that the rotational speed Yt of the input shaft 34 of the STEPTRONIC™ transmission 3 is determined on the basis of the rotational speed Ym of the electric motor 2.

Referring now to FIG. 8, a description will be given of the operation of the drive system K in an "engine restart mode" for restarting the engine 1 in a state wherein the hybrid vehicle is traveling with the engine 1 stopped. As shown in FIG. 8A, in the engine restart mode, the controller 50 turns the engine clutch 5 off and sets the STEPTRONIC™ transmission 3 at a predetermined gear ratio.

In this case, the driving force output from the electric motor 2 is transmitted to drive wheels (not shown) through the intermediary of the STEPTRONIC™ transmission 3 along a path h1 branched from a path indicated by "h" in FIG. 8A and also transmitted to the output shaft 30 of the engine 1 along a path h2 branched from the path "h". According to the differential principle of the planetary gear assembly 4, the rotational speed Ns of the output shaft 30 of the engine 1 connected to the sun gear 10 of the planetary gear assembly 4 is determined on the basis of the rotational speed Nr of the ring gear 13 of the planetary gear assembly 4 connected to the input shaft 34 of the STEPTRONIC™ transmission 3 and the rotational speed Nc of the carrier 12 connected to the electric motor 2 through the intermediary of the gear 33 and the gear 32.

The controller 50 controls the rotational speed Nc of the carrier 12 by the electric motor 2 such that the following equation (3) is satisfied so as to increase the rotational speed Ns of the sun gear 10 (=rotational speed NE of the engine 1) to a cranking rotational speed NE_crk. This restarts the engine 1 while the hybrid vehicle is traveling.

$$Nc = Rc \cdot (Nr - Ns) + Ns = Rc \cdot Nr + (1 - Rc) \cdot Ns = Rc \cdot Nr + (1 - Rc) \cdot NE\_crk \quad (3)$$

where Ns: Number of revolutions of the sun gear 10 (=Number of revolutions of the engine 1); and NE_crk: Cranking rotational speed.

FIG. 8B is a diagram showing the numbers of revolutions of the output shaft 30 of the engine 1, the input/output shaft 31 of the electric motor 2, and the input shaft 34 of the STEPTRONIC™ transmission 3 in the engine restart mode in terms of lengths of the axes of ordinates Ye, Ym and Yt. In the engine restart mode, the rotational speed Yt of the input shaft of the STEPTRONIC™ transmission 3 is determined on the basis of the rotational speed Ye of the engine 1 and the rotational speed Ym of the electric motor 2.

Referring now to FIG. 9, a description will be given of the operation of the drive system K in a "speed change driving force complementary mode" for transmitting the driving force from the electric motor 2 to the output shaft 35 of the STEPTRONIC™ transmission 3 through the intermediary of the torque converter clutch 41 and the torque converter 42 during gear shifting of the STEPTRONIC™ transmission 3.

As shown in FIG. 9A, in the speed change driving force complementary mode, the controller 50 carries out speed change processing in which it turns the engine clutch 5 off, changes a gear ratio of the STEPTRONIC™ transmission 3, and turns the engine clutch 5 back on again. At the time or immediately before the engine clutch 5 is turned off during the speed change processing, the torque converter clutch 41 is controlled to a preset slip rate according to the speed of the hybrid vehicle at the speed change, and the driving force of the electric motor 2 is transmitted to the drive wheels along a path extending from "i1" to "i2" in FIG. 9A.

Thus, even while the transmission of the driving force from the input shaft 34 to the output shaft 35 of the STEPTRONIC™ transmission 3 is cut off during the speed change processing, the transmission of the driving force of the electric motor 2 to the STEPTRONIC™ transmission 3 is maintained. This makes it possible to prevent drivability from deteriorating due to interrupted supply of the driving force.

In this case, to ensure smooth rotational synchronization of the input shaft 34 and the output shaft 35 of the STEPTRONIC™ transmission 3, the controller 50 controls the engine 1 and the electric motor 2 such that the rotational speed Ns of the sun gear 10 coincides with a rotational speed Nr_next of the input shaft 34 of the STEPTRONIC™ transmission 3 after speed change that is determined on the basis of the vehicle speed VP of the hybrid vehicle and a gear ratio of a new set speed of the STEPTRONIC™ transmission 3.

The rotational speed Ns of the sun gear 10 is generally larger than the rotational speed of the output shaft 35 of the STEPTRONIC™ transmission 3 connected to the drive wheels; therefore, the difference in the rotational speed between the two is converted into torque by torque multiplier effect of the torque converter 42. This makes it possible to transmit torque, which is larger than the torque actually output by the electric motor 2, to the output shaft 35 of the STEPTRONIC™ transmission 3 through the intermediary of the torque converter 42, thus preventing interrupted supply of a driving force when the speed change is carried out in the STEPTRONIC™ transmission 3. With this arrangement, the drivability can be improved.

FIG. 9B is a diagram showing the numbers of revolutions of the output shaft 30 of the engine 1, the input/output shaft 31 of the electric motor 2, and the input shaft 34 of the STEPTRONIC™ transmission 3 in the speed change driving force complementary mode in terms of lengths of the axes of ordinates Ye, Ym and Yt. In the speed change driving force complementary mode, the controller 50 controls the engine 1 and the electric motor 2 so synchronize the rotational speed Ye of the engine 1 and the rotational speed Yt of the input shaft 34 of the STEPTRONIC™ transmission 3 after a speed change, thereby reducing a shock in the speed change processing.

Referring now to FIG. 10 through FIG. 22, specific control operations of the drive system K by the controller 50 will be described in detail.

Referring to FIG. 10, the controller 50 receives data signals regarding the degrees of opening AP of an accelerator pedal (not shown) and depressing forces BK applied to a brake pedal (not shown) based on operations performed by a driver of the hybrid vehicle, data signals regarding a charged amount BT_chg of a battery (not shown) connected to the electric motor 2, data signals regarding the actual speed VP of the hybrid vehicle, and data signals regarding the actual rotational speed Nc (=Actual rotational speed of the electric motor 2) of the carrier 12.

Based on the input data signals, the controller 50 outputs engine control parameter signals F_eng_pr, motor drive signals Umot, torque converter clutch control signals SLR, planetary gear brake control signals Up_brk, vehicle brake control signals Uf_brk, and engine clutch control signals CLSRT.

The controller 50 includes a target vehicle speed calculator 60, a driving force manager 61, an engine driving force control unit 62, a STEPTRONIC™ transmission control unit 63, a planetary gear rotation target value calculator 64, a motor control unit 65, a torque converter clutch control unit 66, a planetary gear brake control unit 67, a vehicle brake control unit 68, and an engine clutch control unit 69.

Based on the actual speed VP of the hybrid vehicle, the degree of opening AP of the accelerator pedal, and the depressing force BK of the brake pedal, the target vehicle speed calculator 60 determines a driving force index Udrv used for driving force management processing and the control of the STEPTRONIC™ transmission, which will be discussed hereinafter, a target driving force F_tgt used for engine drive control, which will be discussed hereinafter, and a target vehicle speed VP_tgt used for STEPTRONIC™ transmission control, planetary gear brake control, and vehicle brake control, which will be discussed hereinafter.

Based on the charged amount BT_chg of the battery and the actual vehicle speed VP, the driving force manager 61 determines a drive mode DRV_mode used for the engine drive control and the engine clutch control, which will be discussed hereinafter, and a driving force assist amount RT_ast used for the engine drive control, which will be discussed hereinafter.

The engine driving force control unit 62, which corresponds to the motive power source controlling means in the present invention, determines an engine control parameter F_eng_pr on the basis of the drive mode DRV_mode, the driving force assist amount RT_ast, and a target driving force F_tgt, and also calculates the engine speed NE.

The STEPTRONIC™ transmission control unit 63 carries out the speed change processing on the STEPTRONIC™ transmission 3 on the basis of the target vehicle speed VP_tgt and the driving force index Udrv, calculates a current gear position NGEAR and the gear position of a new speed NGEAR_cmd of the STEPTRONIC™ transmission 3, and a speed change flag F_NGEAR_CHG indicating that the speed change processing is being implemented, and outputs the calculation results to the planetary gear target value calculator 64.

The planetary gear target value calculator 64 calculates a carrier rotation target value Nc_cmd on the basis of the current gear position NGEAR and the gear position of a new speed NGEAR_cmd of the STEPTRONIC™ transmission 3, and the speed change flag F_NGEAR_CHG indicating that the speed change processing is being implemented, and outputs the calculated value to the motor control unit 65.

The motor control unit 65 calculates the motor drive signal Umot on the basis of the actual rotational speed Nc of the carrier 12 and the carrier rotation target value Nc_cmd, and outputs the motor drive signal to the electric motor 2.

The torque converter clutch control unit 66 outputs the control signal SLR of the torque converter clutch 41 while the speed change flag F_NGEAR_CHG is ON (F_NGEAR_CHG=1).

The planetary gear brake control unit 67 outputs a planetary gear brake control signal Up_cmd calculated on the basis of the target vehicle speed VP_tgt.

The vehicle brake control unit 68 calculates a vehicle brake control signal Uf_brk on the basis of the target vehicle speed VP_tgt and the actual vehicle speed VP, and outputs the vehicle brake control signal Uf_brk to the vehicle brake (not shown) for braking the hybrid vehicle.

Figure 11:
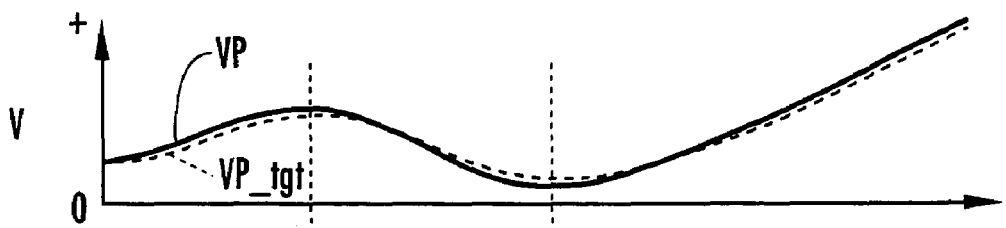
FIGS. 11A through 11D are explanatory diagrams of an operation example of the drive system.
Figure 11:
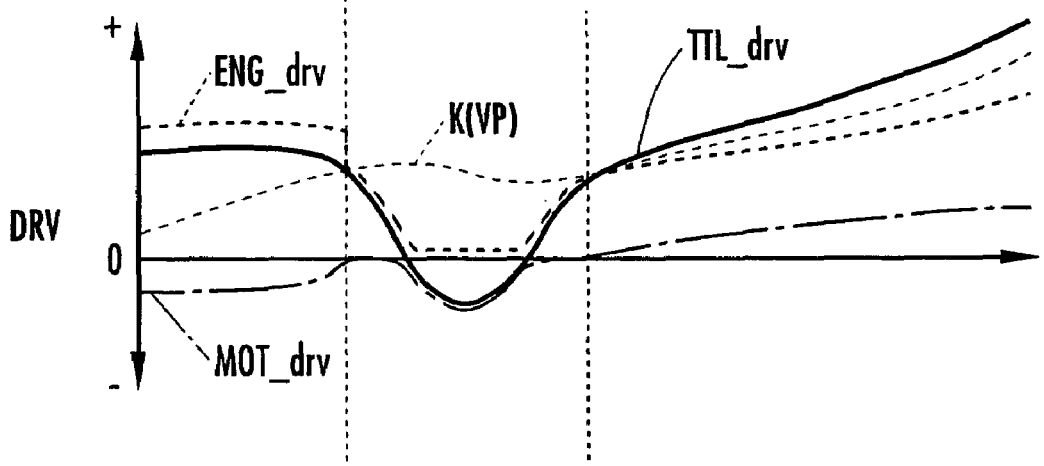
Figure 11:
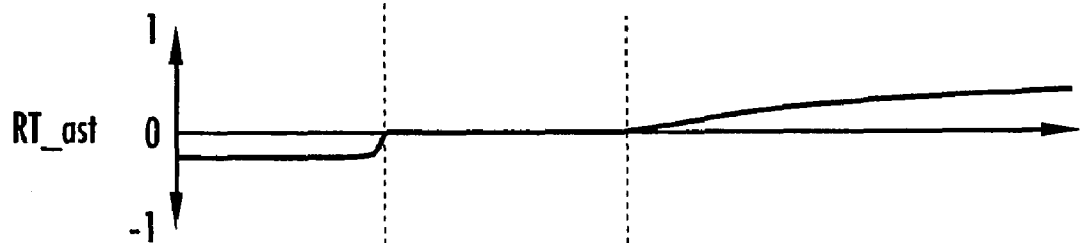
Figure 11:
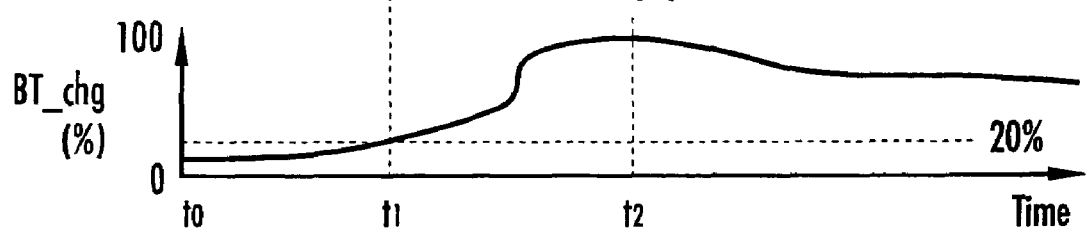

FIG. 11 is a graph showing in a time series an operation example of the drive system K controlled by the controller 50, the axis of abscissa indicating time Time. The axis of ordinate indicates vehicle speed V of the hybrid vehicle in the graph of FIG. 11A, indicates driving forces DRV of the engine 1 and the electric motor 2 in the graph of FIG. 11B, indicates an assist amount RT_ast supplied by the electric motor 2 in the graph of FIG. 11C, and indicates the charged amount BT_chg of the battery in the graph of FIG. 11D.

As shown in FIG. 11A, the controller 50 controls the driving forces supplied by the engine 1 and the electric motor 2 such that the actual vehicle speed VP of the hybrid vehicle coincides with the target vehicle speed VP_tgt.

In the graph of FIG. 11B, ENG_drv denotes the driving force supplied by the engine 1, while MOT_drv denotes the driving force supplied by the electric motor 2. TTL_drv denotes a total driving force supplied by the engine 1 and the electric motor 2, and K_VP denotes travel resistance that changes according to the vehicle speed VP. If MOT_drv is positive (MOT_drv>0), then the electric motor 2 works as an electric motor. If MOT_drv is negative (MOT_drv<0), then the electric motor 2 works as a generator.

Hence, in the graph of FIG. 1C, the power generating operation of the electric motor 2 will provide a negative assist (RT_ast<0) in an acceleration range of time $t_0$ to $t_1$, and a total driving force TTL_drv in the graph of FIG. 11B will be smaller than the engine driving force ENG_drv.

In a deceleration range of time $t_1$ to $t_2$, the electric motor 2 generates power by deceleration energy into electric power to generate electric power by regeneration, so that the assist amount will be zero (RT_ast=0). This is performed in the aforesaid regeneration mode.

In the acceleration range after time $t_2$, the electric motor 2 acts as an electric motor and assists the driving force of the engine 1, leading to a positive assist (RT_ast>0). This is performed in the aforesaid driving force assist mode.

The controller 50 manages the charged amount of the battery, and runs the electric motor 2 by the driving force of the engine 1 to generate electric power so as to charge the battery when the remaining charge amount of the battery reaches 20% or less (BT_chg≦20%) ($t_0$ to $t_1$ in the graph), as shown in FIG. 11D.

Referring now to FIG. 12 through FIG. 22, the control processing of the drive system K by the controller 50 will be explained in detail.

Referring to FIG. 12, the controller 50 first carries out the target vehicle speed calculation processing in STEP1 to calculate the target vehicle speed VP_tgt of the hybrid vehicle. Then, the controller 50 carries out driving force management processing in STEP2 so that the actual vehicle speed VP of the hybrid vehicle coincides with the target vehicle speed, carries out engine driving force control in STEP3, carries out STEPTRONIC™ transmission control in STEP4, and carries out processing for calculating a target value of the rotational speed of the planetary gear in STEP5. The controller 50 furthermore carries out electric motor control in STEP6, carries out engine clutch control in STEP7, carries out torque converter clutch control in STEP8, carries out vehicle brake control in STEP9, and carries out planetary gear brake control in STEP10. The following will describe the procedure for carrying out the processing of STEP1 through STEP10.

First, the procedure for implementing the target vehicle speed calculation processing will be described in conjunction with the flowchart shown in FIG. 13. The target vehicle speed calculation processing is carried out by the target vehicle speed calculator 60 (FIG. 10) installed in the controller 50.

In STEP20, the target vehicle speed calculator 60 takes the degree of opening AP of the accelerator pedal as a driving force index Udrv (Udrv=AP) when the accelerator pedal is operated. When the brake pedal is operated, the target vehicle speed calculator 60 converts the depressing force BK applied to the brake pedal into the degree of opening of the accelerator pedal to calculate the driving force index Udrv according to an equation (4) given below. The degree of opening AP of the accelerator pedal and the depressing force BK applied to the brake pedal correspond to instructions regarding driving conditions in the present invention.

$$Udrv = Kbk \times BK \quad (4)$$

where Udrv: Driving force index; BK: Depressing force applied to the brake pedal; and Kbk: Coefficient for converting depressing forces (0 to max.) applied to the brake pedal into the degrees of opening (0 to −90 deg) of the accelerator pedal.

In the subsequent STEP21, the target vehicle speed calculator 60 applies the actual vehicle speed VP of the hybrid vehicle and the driving force index Udrv to a Udrv/F_tgt map shown in FIG. 13 so as to obtain a target driving force F_tgt. Data of the Udrv/F_tgt map is stored in a memory (not shown) beforehand, and the Udrv/F_tgt map has a plurality of Udrv/F_tgt graphs (UF_h, UF_m, and UF_l) according to actual vehicle speed VP, as shown in the figure. The target vehicle speed calculator 60 selects a Udrv/F_tgt graph based on the actual vehicle speed VP and applies a driving force index Udrv.

In the next STEP22, the target vehicle speed calculator 60 calculates the target vehicle speed VP_tgt on the basis of the target driving force F_tgt.

The target vehicle speed calculator 60 calculates the target vehicle speed VP_tgt according to a model equation represented by the following equation (5).

$$M \cdot \dot{VP} = -K(VP) \cdot VP + F\_tgt \quad (5)$$

where M: Weight of vehicle; VP: Actual vehicle speed; K(VP): Traveling resistance coefficient taking actual vehicle speed (VP) as parameter; and F_tgt: Target driving force Temporally breaking up the above equation (5) leads to the following equation (6). Equation (7) below is derived from the equation (6) when attention is focused on actual vehicle speed.

$$M \frac{VP(k+1) - VP(k)}{dt} = -K(VP) \cdot VP(k) + F\_tgt(k) \quad (6)$$

$$VP(k+1) = \frac{1 - K(VP)dt}{M} VP(k) + \frac{dt}{M} F\_tgt(k) \quad (7)$$

where VP(k+1): Actual vehicle speed in (k+1)th control cycle; and VP(k): Actual vehicle speed in k-th control cycle.

Thus, the target vehicle speed calculator 60 substitutes the actual vehicle speed VP of the hybrid vehicle into VP(k) of the following equation (8) in which VP(k+1) in the above equation (7) has been substituted by a target vehicle speed VP_tgt(k) in the k-th control cycle. Furthermore, the target driving force F_tgt calculated in STEP21 is substituted into F_tgt(k) to obtain the target vehicle speed VP_tgt.

$$VP\_tgt(k) = \frac{1 - K(VP)dt}{M} VP(k) + \frac{dt}{M} F\_tgt(k) \quad (8)$$

where VP_tgt(k) Target driving force in the k-th control cycle.

Referring now to the flowchart shown in FIG. 14, description will be given of the procedure for carrying out the driving force management processing. The driving force management processing is implemented by the driving force manager 61 incorporated in the controller 50, the driving force manager 61 corresponding to the driving force managing means in the present invention.

In STEP30, the driving force manager 61 applies the actual vehicle speed VP of the hybrid vehicle and the driving force index Udrv to the VP, Ud/DRV_Mode_map MAP shown in FIG. 14 so as to acquire a drive mode map value DRV_Mode_map. The data of the VP, Ud/DRV_Mode_map MAP is stored in a memory (not shown) beforehand. As illustrated, the VP, Ud/DRV_Mode_map MAP is divided into areas for setting four drive mode map values (DRV_Mode_map=1, DRV_Mode_map=2, DRV_Mode_map=3, DRV_Mode_map=4) according to the actual vehicle speed VP and the driving force index Udrv. The values of the DRV_Mode_map are keyed to different operation modes, as shown in Table 1 below.

TABLE 1

| DRV_Mode_map | 1 | 2 | 3 | 4 |
|---|---|---|---|---|
| Opertaion mode | Regeneration mode | Engine running mode | Driving force assist mode | Motor running mode |

In the subsequent STEP31, the driving force manager 61 determines whether the charged amount BT_chg of a battery (not shown) is below 20% of a fully charged amount. If the charged amount BT_chg of the battery is below 20%, then the driving force manager 61 proceeds to STEP40 wherein it determines whether the drive mode map value DRV_Mode_map is 3 or 4, namely, the driving force assist mode or the EV running mode (the mode in which the electric motor 2 is operated as an electric motor).

If it is determined in STEP40 that the drive mode map value DRV_Mode_map is 3 or 4, then the driving force manager 61 proceeds to STEP41 wherein it sets the drive mode DRV_Mode to 2 denoting the engine running mode. In the next STEP42, the driving force manager 61 sets the drive assist rate RT_ast to −0.1. If the drive assist rate RT_ast is negative, then the electric motor 2 acts as an electric motor by being rotated by the driving force of the engine 1, meaning that it is a load with respect to the drive wheels.

If it is determined in STEP31 that the charged amount of the battery is 20% or more and determined in STEP40 that the drive mode map value DRV_Mode_map is not 1 or 2 (the driving force assist mode or the EV running mode), then the driving force manager 61 proceeds to STEP32 wherein it sets the drive mode map value DRV_Mode_map to the drive mode DRV_mode.

Then, in the subsequent STEP33, the driving force manager 61 determines whether the drive mode DRV_Mode is 3 denoting the driving force assist mode. If the driving force manager 61 determines that the drive mode DRV_Mode is 3, then it proceeds to STEP 34. In STEP34, the driving force manager 61 applies the battery charged amount BT_chg to a BT_chg/RT_ast MAP shown in FIG. 14 so as to set the drive assist rate RT_ast. The data of the BT_chg/RT_ast MAP is stored in a memory beforehand. The larger the charged amount of the battery (BT_chg, 20 to 100%), the higher the drive assist rate RT_ast is set.

If it is determined in STEP33 that the drive mode DRV_Mode is not 3 (the driving force assist mode), then the driving force manager 61 proceeds to STEP50 wherein it sets the drive assist rate RT_ast to zero (no assist).

Referring now to the flowchart shown in FIG. 15, a description will be given of the procedure for carrying out the engine drive control. The engine drive control is carried out by the engine driving force control unit 62 incorporated in the controller 50, the engine driving force control unit 62 corresponding to the motive power source controlling means in the present invention (refer to FIG. 10).

The engine driving force control unit 62 reduces the target driving force F_tgt on the basis of the drive assist rate RT_ast to calculate the engine driving force F_eng according to the following equation (9) in STEP60.

$$F\_eng = F\_tgt \times (1 - RT\_ast) \qquad (9)$$

where F_eng: Engine driving force

Thus, the engine driving force Feng is determined on the basis of the drive assist rate RT_ast determined on the basis of the charged amount of the battery by the driving force manager 61.

In the driving force management processing, the drive assist rate RT_ast is set to a smaller value as the charged amount of the battery is smaller. Thus, the charged amount of the battery can be maintained at 20% or more by calculating the engine driving force F_eng on the basis of the drive assist rate RT_ast according to the above equation (9), allowing the driving force of the engine 1 to be assisted by the driving force of the electric motor 2.

In the next STEP61, the engine driving force control unit 62 determines a control parameter of the engine 1 according to the drive mode DRV_Mode. More specifically, the engine driving force control unit 62 determines control parameters (the volume of intake air, air-fuel ratio, and ignition timing) of the engine 1 so as to stop the engine 1 in the DRV_Mode=1, 4 (the regeneration mode, the EV running mode), or actuate the engine 1 in the DRV_Mode=2, 3 (the engine running mode, the driving force assist mode), or start the engine 1 in a transient period from DRV_Mode=1, 4 to DRV_Mode=2, 3 (the engine restart mode).

An output torque of the engine 1 is determined on the basis of a set gear ratio of the STEPTRONIC™ transmission 3 and the engine driving force F_eng, so that the engine driving force control unit 62 determines the control parameters of the engine 1 so as to obtain a predetermined output torque.

Referring now to the flowchart shown in FIG. 16, the procedure for carrying out STEPTRONIC™ transmission control will be explained. The STEPTRONIC™ transmission control is implemented by the STEPTRONIC™ transmission control unit 63 (refer to FIG. 10) installed in the controller 50.

The STEPTRONIC™ transmission control unit 63 is first determines in STEP70 whether a driver has issued a request for reverse. If the request for reverse has been issued, then the STEPTRONIC™ transmission control unit 63 proceeds to STEP80 wherein it sets a gear selection target value NGEAR_cmd to −1 (NGEAR=−1), and then proceeds to STEP72. The correspondence between gear selection target value NGEAR_cmd and gear position of the STEPTRONIC™ transmission 3 is shown in Table 2 below.

TABLE 2

| NGEAR_cmd | −1 | 0 | 1 | 2 | 3 | 4 | 5 |
|---|---|---|---|---|---|---|---|
| Gear position | Reverse | Neutral | 1st gear | 2nd gear | 3rd gear | 4th gear | 5th gear |

If no request for reverse has been issued, then the STEPTRONIC™ transmission control unit 63 proceeds to STEP71 wherein it applies the driving force index Udrv and the actual vehicle speed VP to a Udrv, VP/NGEAR_cmd MAP shown in FIG. 16 so as to acquire a gear selection target value NGEAR_cmd.

Data of the Udrv, VP/NGEAR_cmd MAP is stored in a memory beforehand. As shown in FIG. 16, the Udrv, VP/NGEAR_cmd MAP sets the gear selection target values of the STEPTRONIC™ transmission 3 to five different speeds (1st, 2nd, 3rd, 4th, and 5th, and neutral denoted by N in FIG. 16.

In the subsequent STEP72, the STEPTRONIC™ transmission control unit 63 starts the operation for changing the speed in the STEPTRONIC™ transmission 3 and determines in STEP73 whether the gear selection target value NGEAR_cmd coincides with the gear position NGEAR of the STEPTRONIC™ transmission 3. If the gear selection target value NGEAR_cmd does not coincide with the gear position NGEAR of the STEPTRONIC™ transmission 3, then the STEPTRONIC™ transmission control unit 63 proceeds to STEP85 wherein it turns a speed change flag F_NGEAR_CHG on (F_NGEAR_CHG=1), which indicates that the operating for changing speed is being performed.

If the gear selection target value NGEAR_cmd coincides with the gear position NGEAR of the STEPTRONIC™ transmission 3, meaning that the speed changing operation is finished, then the STEPTRONIC™ transmission control unit 63 proceeds to STEP74 wherein it turns the speed change flag F_NGEAR_CHG off (F_NGEAR_CHG=0).

Referring now to the flowchart shown in FIG. 17, a description will be given of the procedure for performing planetary gear rotation target value calculation processing. The planetary gear rotation target value calculation processing is carried out by the planetary gear rotation target value calculator 64 (refer to FIG. 10) including the function of the speed change controlling means in the present invention.

The planetary gear rotation target value calculator 64 first determines whether the speed change flag F_NGEAR_CHG is on in STEP90. If the speed change flag is on (F_NGEAR_CHG=1), that is, if the speed changing operation is being performed on the STEPTRONIC™ transmission 3, then the planetary gear rotation target value calculator 64 proceeds to STEP100 wherein it sets the gear selection target value NGEAR_cmd at a speed change index NGEAR_index, and then proceeds to STEP92.

If it is determined in STEP90 that the speed change flag is off (F_NGEAR_CHG=0), that is, if the speed changing operation of the STEPTRONIC™ transmission 3 has been finished, then the planetary gear rotation target value calculator 64 proceeds to STEP91 wherein it sets the current gear position NGEAR at a speed change index NGEAR_index, and then proceeds to STEP92.

In STEP92, the planetary gear rotation target value calculator 64 applies the speed change index NGEAR_index to a NGEAR_index/Rt MAP shown in FIG. 17 so as to acquire a total gear ratio Rt. Table 3 given below shows a relationship between speed change index NGEAR_index and gear position of the STEPTRONIC™ transmission 3. Data of the NGEAR_index/Rt MAP is stored in a memory beforehand.

TABLE 3

| NGEAR_index | −1 | 0 | 1 | 2 | 3 | 4 | 5 |
|---|---|---|---|---|---|---|---|
| Gear position | Reverse | Neutral | 1st gear | 2nd gear | 3rd gear | 4th gear | 5th gear |

In the subsequent STEP93, the planetary gear rotation target value calculator 64 calculates a target value of the rotational speed of the ring gear Nr_cmd according to the following equation (10).

$$Nr\_cmd = Rt \times Vp\_tgt \quad (10)$$

where Nr_cmd: Ring gear rotational speed target value; Rt: Total gear ratio; and VP_tgt: Target vehicle speed.

In the next STEP94, the planetary gear rotation target value calculator 64 determines whether the engine 1 is at rest. If the engine 1 is at rest, then the planetary gear rotation target value calculator 64 proceeds to STEP110 wherein it sets the sun gear rotational speed target value Ns_cmd to zero to stop the rotation of the engine 1, and then proceeds to STEP98.

The sun gear rotational speed target value Ns_cmd is set to zero also in the EV running mode and the regeneration mode because the engine 1 is placed in a halted state, as well as in the state wherein the engine 1 stops as the vehicle stops.

If it is determined in STEP94 that the engine 1 is not at rest, then the planetary gear rotation target value calculator 64 proceeds to STEP95 wherein it determines whether the engine 1 is being started. If it is determined that the engine 1 is being started, then the planetary gear rotation target value calculator 64 proceeds to STEP120 wherein it sets the sun gear rotational speed target value Ns_cmd at a cranking rotational speed NE_crk so as to crank the engine 1 (the engine start mode), and then proceeds to STEP98.

If it is determined in STEP95 that the engine 1 is not being started, then the planetary gear rotation target value calculator 64 proceeds to STEP96 wherein it determines whether the speed change flag F_NGEAR_CHG has been set. If the speed change flag has been set (F_NGEAR_CHG=1), then the planetary gear rotation target value calculator 64 proceeds to STEP97 wherein it sets the ring gear rotational speed target value Nr_cmd at the sun gear rotational speed target value Ns_cmd to synchronize the rotational speed of the sun gear 10 and the rotational speed of the ring gear 13. Then, the planetary gear rotation target value calculator 64 proceeds to STEP98.

If it is determined in STEP96 that the speed change flag F_NGEAR_CHG has not been set, that is, if the engine 1 is in operation and the speed changing operation of the STEPTRONIC™ transmission 3 has been finished (the driving force assist mode and the engine running mode), then the planetary gear rotation target value calculator 64 proceeds to STEP130. The planetary gear rotation target value calculator 64 sets the engine rotational speed NE at the sun gear rotational speed target value Ns_cmd to synchronize the rotational speed of the sun gear 10 and the rotational speed of the engine 1. Then, the planetary gear rotation target value calculator 64 proceeds to STEP98.

In STEP98, the planetary gear rotation target value calculator 64 calculates a carrier rotational speed target value Nc_cmd according to the following equation (11).

$$Nc\_cmd = Rc \times Nr\_cmd + (1-Rc) \cdot Ns\_cmd \quad (1)$$

where Nc_cmd: Carrier rotational speed target value; Rc: Gear ratio of the planetary pinion gear to the ring gear; Nr_cmd: Ring gear rotational speed target value; and Ns_cmd: Sun gear rotational speed target value In the driving force assist mode, by setting the ring gear rotational speed target value Nr_cmd higher than the rotational speed NE of the engine 1, the carrier rotational speed target value Nc_cmd is determined according to the above equation (11), and the rotational speed of the carrier 12 is placed under feedback control.

In the regeneration mode, a regeneration amount is determined by setting the target vehicle speed VP_tgt to the speed reduced due to traveling resistance with respect to the actual vehicle speed VP when the hybrid vehicle is decelerated.

In the motor running mode, a target output of the electric motor 2 is determined by the planetary gear rotation target value calculator 64, which calculates the carrier rotational speed target value Nc_cmd based on the ring gear rotational speed target value Nr_cmd (=the rotational speed of the input shaft 34 of the STEPTRONIC™ transmission 3) according to the above equation (11) such that the actual vehicle speed VP coincides with the target vehicle speed VP_tgt.

While the speed changing operation is being performed on the STEPTRONIC™ transmission 3, the ring gear rotational speed target value Nr_cmd calculated on the basis of the target vehicle speed VP_tgt and the gear ratio Rt upon completion of speed change according to the above equation (10) is set at the sun gear rotational speed target value Ns_cmd in STEP77. Thus, the rotational speed of the electric motor 2 is controlled by the motor control, which will be discussed hereinafter, such that the rotational speed of the ring gear 13 (=the rotational speed of the input shaft 34 of the STEPTRONIC™ transmission 3) is synchronized with the rotational speed of the ring gear 13 after the speed is changed. With this arrangement, a speed change shock of the STEPTRONIC™ transmission 3 can be reduced, permitting improved drivability of the hybrid vehicle to be achieved.

Referring now to the flowchart shown in FIG. 18, the procedure for carrying out the motor control will be described. The motor control is carried out by the motor control unit 65 (refer to FIG. 10) provided in the controller 50, the motor control unit 65 corresponding to the electric drive source controlling means in the present invention.

The motor control unit 65 performs computation according to the following equations (12) to (15) for each predetermined control cycle to calculate a motor control input Umot to the electric motor 2 by response specifying control.

$$E\_Nc(k) = Nc(k) - Nc\_cmd(k) \quad (12)$$

where E_Nc(k): Deviation of the rotational speed of the electric motor in a k-th control cycle; Nc(k): Number of revolutions of the carrier in the k-th control cycle (=Number of revolutions of the electric motor); and Nc_cmd(k): Carrier rotational speed target value in the k-th control cycle.

$$SIGMA(k) = E\_Nc(k) + POLE \cdot E\_Nc(k-1) \quad (13)$$

where SIGMA(k): Switching function value in the k-th control cycle; POLE: Switching function setting parameter (−1<POLE<0); and E_Nc(k−1): Deviation of the rotational speed of the electric motor in a (k−1)th control cycle.

$$SUMSIGMA(k) = SUMSIGMA(k-1) + SIGMA(k) \quad (14)$$

where SUMSIGMA(k): Integrated value of switching functions up to a k-th control cycle; and SUMSIGMA(k−1):

Integrated value of switching functions up to a (k−1)th control cycle.

$$Umot(k) = -Krch \cdot SIGMA(k) - Kadp \cdot SUMSIGMA(k) \tag{15}$$

where Umot(k): Motor control input in the k-th control cycle; and Krch, Kadp: Feedback gain (constant)

The motor control unit 65 first calculates, in STEP140, the difference in the rotational speed of the motor E_Nc(k) in the current control cycle according to the above equation (12). Then, in the following STEP141, the motor control unit 65 calculates the switching function value SIGMA(k) in the current control cycle according to the above equation (13). In STEP142, the motor control unit 65 calculates the switching function integrated value SUMSIGMA(k) in the current control cycle according to the above equation (14).

In the next STEP143, the motor control unit 65 calculates the motor control input Umot(k) in the current control cycle according to the above equation (15). Thus, calculating the motor control input Umot by using the response specifying control makes it possible to restrain the occurrence of response delays or overshoots and allow the actual rotational speed Nc of the carrier 12 to accurately follow the carrier rotational speed target value Nc_cmd.

Referring now to the flowchart shown in FIG. 19, the procedure for carrying out engine clutch control will be described. The engine clutch control is carried out by the engine clutch control unit 69 (refer to FIG. 10) provided in the controller 50.

The engine clutch control unit 69 determines in STEP150 whether the drive mode DRV_mode is 2, which means the engine running mode. If the drive mode has been set to 2, namely, the engine running mode, then the engine clutch control unit 69 proceeds to STEP151.

In STEP151, the engine clutch control unit 69 applies the actual vehicle speed VP to a VP/CLSRT MAP shown in FIG. 19 to acquire a clutch slip rate CLSRT.

Data of the VP/CLSRT MAP is stored in a memory beforehand. The VP/CLSRT MAP has three different VP/CLSRT graphs, namely, an AP1 (large AP), AP2 (medium AP), and AP3 (small AP), according to the degrees of opening of the accelerator pedal AP, as shown in FIG. 19. The engine clutch control unit 69 selects a VP/CLSRT graph from among AP1 to AP3 according to the degree of opening of the accelerator pedal AP.

If it is determined in STEP150 that the drive mode DRV_mode is not 2, that is, not the engine running mode, then the engine clutch control unit 69 proceeds to STEP160 wherein it sets the clutch slip rate CLSRT to 100% to turn the engine clutch 5 off.

Thus, by determining the slip rate of the engine clutch 5 on the basis of the degree of opening of the accelerator pedal AP and the actual vehicle speed VP, the engine clutch control unit 69 increases the slip rate of the engine clutch 5 to cause creeping to take place in an extremely low speed range.

Referring now to the flowchart shown in FIG. 20, the procedure for carrying out vehicle brake control will be described. The vehicle brake control is carried out by a vehicle brake control unit 68 (refer to FIG. 10) installed in the controller 50, the vehicle brake control unit 68 corresponding to the brake controlling means in the present invention.

The vehicle brake control unit 68 performs computation according to the following equations (16) to (19) for each predetermined control cycle to calculate a vehicle brake control input Uf_brk to a vehicle brake (not shown), which corresponds to the braking means in the present invention, by the response specifying control.

$$E\_vp(k) = VP(k) - VP\_tgt(k) \tag{16}$$

where E_vp(k): Deviation of vehicle speed in a k-th control cycle; VP(k): Actual vehicle speed in the k-th control cycle; and VP_tgt(k): Target vehicle speed in the k-th control cycle.

$$SIGMA'(k) = E\_vp(k) + POLE' \cdot E\_vp(k-1) \tag{17}$$

where SIGMA'(k): Switching function value in the k-th control cycle; and POLE': Switching function setting parameter (−1<POLE'<POLE<0).

$$SUMSIGMA'(k) = SUMSIGMA'(k-1) + SIGMA'(k) \tag{18}$$

where SUMSIGMA'(k): Integrated value of switching functions in a k-th control cycle $$Uf\_brk'(k) = -Krch' \cdot SIGMA'(k) - Kadp' \cdot SUMSIGM'(k) \tag{19}$$

where Uf_brk'(k): Calculated value of vehicle brake control input in the k-th control cycle; and Krch', Kadp': Feedback gain.

$$Uf\_brk(k) = \begin{cases} |Uf\_brk'(K)| & (Uf\_brk'(k) \leq 0) \\ 0 & (Uf\_brk'(k) > 0) \end{cases} \tag{20}$$

where Uf_brk(k): Set value of vehicle brake control input in the k-th control cycle The vehicle brake control unit 68 first calculates, in STEP170, the vehicle speed deviation E_vp(k) of the hybrid vehicle in the current control cycle according to the above equation (16). Then, in the following STEP171, the vehicle brake control unit 68 calculates the switching function value SIGMA' (k) in the current control cycle according to the above equation (17). In STEP172, the vehicle brake control unit 68 calculates the switching function integrated value SUMSIGMA' (k) in the current control cycle according to the above equation (18).

In the next STEP173, the vehicle brake control unit 68 calculates a vehicle brake control amount Uf_brk' (k) in the current control cycle according to the above equation (19). If a value of the vehicle brake control amount Uf_brk' (k) is negative, then it is a control value for reducing the actual vehicle speed VP. Therefore, the absolute value of the vehicle brake control amount Uf_brk' (k) is used as the vehicle brake control input in the above equation (20) to actuate the vehicle brake, thereby decelerating the vehicle.

If a value of the vehicle brake control amount Uf_brk' (k) is positive, then it is a control value for increasing the actual vehicle speed VP. Therefore, the vehicle brake control input Uf_brk(k) is set to zero so as to release the vehicle brake.

The switching function setting parameter POLE' of the response specifying controller for the brake in the above equation (17) is set to a value smaller than the switching function setting parameter POLE of the response specifying controller for the motor in the above equation (13), as indicated by −1<POLE'<POLE<0.

Hence, the response speed of the electric motor 2 (the convergent speed of the difference in the rotational speed of the electric motor 2, E_Nc) becomes higher than the response speed of the vehicle brake (the convergent speed of the vehicle speed difference E_vp), making it possible to restrain interference between the response specifying controller for the motor and the response specifying controller for the brake.

Referring now to the flowchart shown in FIG. 21, a description will be given of the procedure for carrying out torque converter clutch control. The torque converter clutch control is conducted by the torque converter clutch control unit 66 (refer to FIG. 10) corresponding to the transmitted driving force controlling means in the present invention. The torque converter clutch control unit 66 controls the slip rate SLR of the torque converter clutch 41 so that it remains within a range of 0% (tight) to 100% (released).

The torque converter clutch control unit 66 first determines in STEP180 whether the speed change flag F_NGEAR_CHG is on. If it is determined that the speed change flag is on (F_NGEAR_CHG=1), that is, if the speed changing operation is being performed on the STEPTRONIC™ transmission 3, then the torque converter clutch control unit 66 proceeds to STEP181 wherein it applies the actual vehicle speed VP of the hybrid vehicle to a VP/SLR MAP shown in FIG. 21 to acquire the torque converter clutch slip rate SLR.

The controller 50 controls the slip rate of the torque converter clutch 41 on the basis of the torque converter clutch slip rate SLR. This allows the driving force to be transmitted to the drive wheels from the electric motor 2 through the intermediary of the torque converter clutch 41 and the torque converter 42 even while the speed changing operation of the STEPTRONIC™ transmission 3 is being performed. It is possible, therefore, to restrain drivability from degrading due to interrupted supply of the driving force.

If it is determined in STEP180 that the speed change flag is not on (F_NGEAR_CHG=0), that is, if the speed changing operation of the STEPTRONIC™ transmission 3 is finished, then the torque converter clutch control unit 66 proceeds to STEP190 wherein it sets the torque converter clutch slip rate SLR to 100% (released). Thus, in the state wherein the speed changing operation of the STEPTRONIC™ transmission 3 has been completed, the transmission of the driving force from the electric motor 2 to the drive wheels through the intermediary of the torque converter clutch 41 is cut off.

Referring now to the flowchart shown in FIG. 22, a description will be given of the procedure for carrying out planetary gear brake control. The planetary gear brake control is conducted by the planetary gear brake control unit 67 (see FIG. 10) installed in the controller 50.

The planetary gear brake control unit 67 determines in STEP200 whether the target vehicle speed VP_tgt is zero. If it is determined that the target vehicle speed VP_tgt is zero, then the planetary gear brake control unit 67 proceeds to STEP201 and turns on the ring gear brake 6 (see FIG. 1A). This disables the rotation of the ring gear 13 (see FIG. 1A), enabling the engine start mode shown in FIG. 2 and the power generation mode shown in FIG. 3 to be implemented.

If it is determined in STEP200 that the target vehicle speed VP_tgt is not zero, then the planetary gear brake control unit 67 proceeds to STEP210 wherein it turns the ring brake 6 off. This enables the rotation of the ring gear 13, making it possible to implement the driving force assist mode, the engine running mode, the EV running mode, the regeneration mode, the engine restart mode, and the speed change driving force complementary mode shown in FIG. 4 through FIG. 9.

The controller 50 executes the series of steps shown in FIG. 12 according to the flowcharts of FIG. 13 through FIG. 22 described above, allowing the actual vehicle speed VP of the hybrid vehicle to accurately follow the target vehicle speed VP_tgt based on the operation performed by the driver.

In the present embodiment, the engine has been used as the motive power source in the present invention. Alternatively, however, other types of motive power sources, such as an electric motor, may be used.

In the planetary gear assembly 4 according to the present embodiment, the output shaft 30 of the engine 1 is connected to the sun gear 10, the input/output shaft 31 of the electric motor 2 is connected to the carrier 12, and the input shaft 34 of the STEPTRONIC™ transmission 3 is connected to the ring gear 13. Alternatively, however, the connection layout may be modified, as necessary. More efficiently, it is desirable to construct the planetary gear assembly 4 by combining three rotating elements, namely, the sun gear 10, the ring gear 13, and the carrier 12, so that, if the rotation of one rotating element (e.g., the carrier in case of a single pinion or a ring gear in case of a double pinion) out of the three rotating elements is fixed, then the remaining two rotating elements are reversed.

When one rotating element is fixed as described above, connecting the electric motor 2 to the fixed rotating element makes it possible to implement the component units in the present embodiment to be constructed without increasing the rotational speed of the electric motor 2. This makes it possible to reduce the heat generated in the electric motor 2, the load on a rotor, and demagnetization in a rotor magnet.

In the present embodiment, the motor control unit 65 and the vehicle brake control unit 68 have used the slide mode control; however, the control method is not limited thereto. For example, other types of response specifying control, such as back stepping control, or a control method other than the response specifying control may be adopted.

The present embodiment has shown the example in which the drive system according to the present invention has been applied to a hybrid vehicle. The present invention, however, can be applied to other types of apparatuses, such as an outboard motor, which require driving forces.

In the present embodiment, the drive system K is equipped with the torque converter 42 and the torque converter clutch 41 (see FIG. 1A) to carry out the torque converter clutch control in which the driving force transmitted from the electric motor 2 to the output shaft 35 of the STEPTRONIC™ transmission 3 is adjusted. The advantages of the present invention, however, can be obtained even if the torque converter 42 and the torque converter clutch 41 are not provided.

What is claimed is:

1. A drive system comprising:
a motive power source;
an electric drive source serving as a generator and also as a motor;
a planetary gear mechanism; and
a transmission,
wherein the transmission comprises at least two force transmitting paths including a first force transmitting path and a second force transmitting path different from the first force transmitting path,
wherein the planetary gear mechanism comprises three rotary elements, namely, a sun gear rotating about the center of a central shaft, a carrier which rotatably supports a planetary pinion gear moving about the outer periphery of the sun gear while rotating on an axis in engagement with the sun gear and which rotates about the center of the central shaft, and a ring gear rotating about the center of the central shaft on the outer side of the planetary pinion gear while being meshed with the planetary pinion gear, one of the three rotary elements of the planetary gear mechanism is connected to an output shaft of the motive power source, another one of the rotary elements is connected to an input shaft of the transmission, and the remaining one of the rotary elements is connected to an input/output shaft of the electric drive source, wherein the drive system further comprises motive power connecting/disconnecting means for selectively providing connection between the output shaft of the motive power source and the rotary element of the planetary gear mechanism connected to the input shaft of the transmission, while bypassing the rotary element of the planetary gear mechanism connected to the output shaft of the motive power source, and disconnection between the output shaft of the motive power source and the rotary element of the planetary gear mechanism connected to the input shaft of the transmission, wherein the transmission comprises a transmission having the input shaft provided with a train of input gears and an output shaft provided with a train of output gears meshing with the train of input gears, and the drive system comprises driving force transmitting means provided between the input/output shaft of the electric drive source and the output shaft of the transmission for adjusting a driving force output from the electric drive source and transmitting the adjusted driving force to the output shaft of the transmission, wherein the first force transmitting path travels from the input/output shaft of the electric drive source through the driving force transmitting means to the output shaft of the transmission, and wherein the second force transmitting path travels from the input shaft of the transmission through the train of input gears and the train of output gears to the output shaft.

2. The drive system according to claim 1, comprising rotation regulating means for regulating the rotation of the rotary element connected to the input shaft of the transmission.

3. The drive system according to claim 1, wherein the driving force transmitting means comprises a torque converter.

4. The drive system according to claim 1 or 2, wherein the drive system further comprises speed changing control means for controlling the rotational speed of the electric drive source such that the rotational speed of the input shaft of the transmission corresponds to the rotational speed obtained by multiplying the rotational speed of the output shaft of the transmission by a gear ratio of a new speed when performing speed change processing on the transmission.

5. The drive system according to claim 1, comprising transmitted driving force control means for adjusting a driving force to be transmitted to the output shaft of the transmission from the input/output shaft of the electric drive source by the driving force transmitting means on the basis of the rotational speed of the output shaft of the transmission during the speed change processing performed in the transmission.

6. The drive system according to claim 1, wherein
the drive system is mounted on a movable body, and comprises:
motive power source control means for controlling an output of the motive power source according to an instruction for a predetermined driving condition; and
electric drive source control means for controlling an output of the electric drive source so that an actual speed of the movable body follows a target speed of the movable body set according to the driving condition instruction.

7. The drive system according to claim 6, comprising driving force managing means for determining an output of the motive power source according to a charged condition of storage means connected to the electric drive source.

8. The drive system according to claim 6 or 7, wherein the electric drive source control means determines an output of the electric drive source by using response specifying control that permits variable designation of an attenuation behavior and an attenuation speed of a difference between the target speed and the actual speed of the movable body so as to make the actual speed of the movable body follow the target speed.

9. The drive system according to claim 6 or 7, comprising:
braking means for braking the movable body; and
braking control means for determining a braking force of the braking means by using response specifying control that permits variable designation of an attenuation behavior and an attenuation speed of a difference between the target speed and the actual speed of the movable body so as to make the actual speed of the movable body follow the target speed.

10. The drive system according to claim 9, wherein
the electric drive source control means determines an output of the electric drive source by using response specifying control that permits variable designation of the attenuation behavior and the attenuation speed of a difference between the target speed and the actual speed of the movable body so as to make the actual speed of the movable body follow the target speed, and
a first attenuation speed of the difference between the target speed and the actual speed of the movable body in the response specifying control used by the electric drive source control means is set to be higher than a second attenuation speed of the difference between the target speed and the actual speed of the movable body in the response specifying control used by the braking control means.

* * * * *